United States Patent
Wu et al.

(10) Patent No.: US 12,452,448 B2
(45) Date of Patent: Oct. 21, 2025

(54) ENHANCED MOTION VECTOR PREDICTION

(71) Applicant: Apple Inc., Cupertino, CA (US)

(72) Inventors: Yeqing Wu, San Jose, CA (US); Alexandros Tourapis, Los Gatos, CA (US); Yunfei Zheng, Santa Clara, CA (US); Hsi-Jung Wu, San Jose, CA (US); Jun Xin, San Jose, CA (US); Albert E. Keinath, Sunnyvale, CA (US); Mei Guo, San Jose, CA (US); Alican Nalci, San Diego, CA (US)

(73) Assignee: Apple Inc., Cupertino, CA (US)

( * ) Notice: Subject to any disclaimer, the term of this patent is extended or adjusted under 35 U.S.C. 154(b) by 237 days.

(21) Appl. No.: 17/736,881

(22) Filed: May 4, 2022

(65) Prior Publication Data
US 2022/0360814 A1    Nov. 10, 2022

Related U.S. Application Data

(60) Provisional application No. 63/185,202, filed on May 6, 2021.

(51) Int. Cl.
| | |
|---|---|
| H04N 19/00 | (2014.01) |
| H04N 19/105 | (2014.01) |
| H04N 19/124 | (2014.01) |
| H04N 19/159 | (2014.01) |
| H04N 19/176 | (2014.01) |
| H04N 19/52 | (2014.01) |

(52) U.S. Cl.
CPC .......... *H04N 19/52* (2014.11); *H04N 19/105* (2014.11); *H04N 19/124* (2014.11); *H04N 19/159* (2014.11); *H04N 19/176* (2014.11)

(58) Field of Classification Search
CPC ...................................................... H04N 19/00
See application file for complete search history.

(56) References Cited

U.S. PATENT DOCUMENTS

| | | | |
|---|---|---|---|
| 2009/0148058 A1* | 6/2009 | Dane | H04N 19/154 |
| | | | 382/251 |
| 2021/0289205 A1* | 9/2021 | Saitou | H04N 19/136 |

OTHER PUBLICATIONS

Han et al., "A Technical Overview of AV1," arXiv: 2008.06091v1, Aug. 13, 2020, 25 pages.

Kazui et al., "Improvement on simplified motion vector prediction," Joint Collaborative Team on Video Coding (JCT-VC) of ITU-T SG16 WP3 and ISO/IEC JTC1/SC29/WG11, Document JCTVC-E062, Mar. 18, 2011, 9 pages.

Kim et al., "Fast Inter-Prediction based on Decision Trees for AV1 encoding," arXiv: 1908.1166v1, Aug. 29, 2019, 5 pages.

(Continued)

*Primary Examiner* — Maryam A Nasri
(74) *Attorney, Agent, or Firm* — Fish & Richardson P.C.

(57) ABSTRACT

An encoder or decoder can perform enhanced motion vector prediction by receiving an input block of data for encoding or decoding and accessing stored motion information for at least one other block of data. Based on the stored motion information, the encoder or decoder can generate a list of one or more motion vector predictor candidates for the input block in accordance with an adaptive list construction order. The encoder or decoder can predict a motion vector for the input block based on at least one of the one or more motion vector predictor candidates.

20 Claims, 17 Drawing Sheets

(56) References Cited

OTHER PUBLICATIONS

PCT International Search Report and Written Opinion in International Application No. PCT/US2022/072156, dated Oct. 25, 2022, 19 pages.

Zhang et al., "AHG12: Adaptive Reordering of Merge Candidates with Template Matching," Joint Video Experts Team (JVET) of ITU-T SG 16 WP 3 and ISO/IEC JTC 1/SC 29, Document: JVET-V0099, Apr. 14, 2021, 4 pages.

* cited by examiner

| Category | Search Order |
|---|---|
| Category 1 | (1) row scan |
| | (2) col scan |
| | (3) TR |
| Category 2 | Temporal |
| | (4) TL |
| | (5) row scan |
| | (6) col scan |
| | (7) row scan |
| | (8) col scan |

*FIG. 11*

| Category | Search Order |
|---|---|
| Category 1 | (1) row scan |
| | (2) col scan |
| | (3) TR |
| | Temporal (translational motion with close temporal distance) |
| Category 2 | Temporal (others, like global and local warp) |
| | (4) TL |
| | (5) row scan |
| | (6) col scan |
| | (7) row scan |
| | (8) col scan |

*FIG. 12*

ENHANCED MOTION VECTOR PREDICTION

CROSS-REFERENCE TO RELATED APPLICATION

This application claims priority to U.S. Provisional Patent Application No. 63/185,202, filed May 6, 2021, the entire contents of which are incorporated herein by reference.

TECHNICAL FIELD

This disclosure relates generally to encoding and decoding of data, such as image and video data.

BACKGROUND

In video sequences, a strong correlation may exist between pixel values in successive frames or within a frame. This is especially true when frames of a video sequence are densely sampled in space (e.g., high resolution frames) or time (e.g., high frame rate). Strong spatial and temporal correlation may also exist between groups of pixels, e.g. blocks, in a spatial or temporal neighborhood. Such correlation may not only relate to the pixel values within a block but also block characteristics such as their motion. Coding performance in the context of video compression partly targets such correlations through the use of predictive techniques. Motion compensation, in particular, is used to predict coding blocks in a current frame based on one or more matching areas or blocks from one or more reference frames. Prediction of coding blocks and their motion parameters can help improve coding performance.

SUMMARY

In general, in a first aspect, a decoder includes at least one processor and memory storing instructions which, when executed by the at least one processor, cause the at least one processor to perform operations including: receiving an input block of data, accessing stored motion information for at least one other block of data, based on the stored motion information, generating a list of one or more motion vector predictor candidates for the input block in accordance with an adaptive list construction order, and predicting a motion vector for the input block based on at least one of the one or more motion vector predictor candidates.

In general, in a second aspect combinable with the first aspect, the decoder is configured to generate a predicted block for the input block by applying the motion vector to the at least one other block, and decode the input block based at least in part on the predicted block.

In general, in a third aspect combinable with the first or second aspects, the input block is part of a current frame, and the decoder is configured to: identify a plurality of reference frames for the current frame, determine a score for each of the plurality of reference frames based at least in part on a temporal distance between the current frame and the respective reference frame, and based on the score, prioritize the plurality of reference frames.

In general, in a fourth aspect combinable with any of the first through third aspects, determining the score for each of the plurality of reference frames is based at least in part on a pixel quality of at least a portion of the respective reference frame.

In general, in a fifth aspect combinable with any of the first through fourth aspects, determining the score for each of the plurality of reference frames is based at least in part on whether a motion vector associated with the respective reference frame crosses the current frame.

In general, in a sixth aspect combinable with any of the first through fifth aspects, the decoder is configured to generate, based on the stored motion information, a projected motion vector from the current frame to a first reference frame of the plurality of reference frames, and assign a priority to the projected motion vector based at least in part on the score of the first reference frame.

In general, in a seventh aspect combinable with any of the first through sixth aspects, the projected motion vector is a first projected motion vector, and the decoder is configured to generate a second projected motion vector from the current frame to a second reference frame of the plurality of reference frames, in which the second reference frame has a lower score than the first reference frame, and in which the first projected motion vector is not allowed to be overwritten by the second projected motion vector due to the second reference frame having a lower score than the first reference frame.

In general, in an eighth aspect combinable with any of the first through seventh aspects, the at least one other block is a previously coded block having been coded using inter uni-prediction, and the stored motion information includes a motion vector with a backward reference.

In general, in a ninth aspect combinable with any of the first through eighth aspects, the at least one other block is a previously coded block having been coded using intra prediction, and the stored motion information includes a projected motion vector.

In general, in a tenth aspect combinable with any of the first through ninth aspects, the decoder is configured to: determine that the motion information for the at least one other block includes linear motion, determine that a temporal distance between a frame associated with the at least one other block and a frame associated with the input block satisfies a threshold value, and increase a priority of a motion vector predictor candidate associated with the at least one other block in the list of the one or more motion vector predictor candidates based on the determination that the motion information includes linear motion and the determination that the temporal distance satisfies the threshold value.

In general, in an eleventh aspect combinable with any of the first through tenth aspects, the input block and the at least one other block are part of a same frame, and the decoder is configured to: determine that a reference frame of the at least one other block is different from but in the same direction as a reference frame of the input block, and responsive to the determination, apply a scaling algorithm to the motion information for the at least one other block to generate a motion vector predictor for the input block.

In general, in a twelfth aspect combinable with any of the first through eleventh aspects, the input block is coded in an inter uni-prediction mode.

In general, in a thirteenth aspect combinable with any of the first through twelfth aspects, the decoder is configured to: access stored motion information for at least two other blocks of data, the at least two other blocks and the input blocks of data being part of a same frame, determine that a reference frame for each of the at least two other blocks is different from a reference frame of the input block, and responsive to the determination, combine the motion information for the at least two other previously coded blocks of data to generate a motion vector predictor for the input block.

In general, in a fourteenth aspect combinable with any of the first through thirteenth aspects, the input block is coded in a bi-predictive or multi-hypothesis inter prediction mode.

In general, in a fifteenth aspect combinable with any of the first through fourteenth aspects, the input block is a first block of a first tile row, and the decoder is configured to store the list of one or more motion vector predictor candidates for the input block as a list of one or more motion vector predicator candidates for a first block of a second tile row.

In general, in a sixteenth aspect combinable with any of the first through fifteenth aspects, the stored motion information is downsampled, and the decoder is configured to: upconvert the stored motion information, and generate the list of the one or more motion vector predictor candidates for the input block based on the upconverted motion information.

In general, in a seventeenth aspect combinable with any of the first through sixteenth aspects, the stored motion information is quantized, and the decoder is configured to: inverse quantize the stored motion information, and generate the list of the one or more motion vector predictor candidates for the input block based on the upconverted motion information.

In general, in an eighteenth aspect, a method for decoding data includes performing the operations of any of the first through seventeenth aspects.

In general, in a nineteenth aspect, a non-transitory computer-readable medium stores instructions which, when executed by at least one processor, cause the at least one processor to perform the operations of any of the first through seventeenth aspects.

In general, in a twentieth aspect, an encoder includes at least one processor and memory storing instructions which, when executed by the at least one processor, cause the at least one processor to perform operations including: receiving an input block of data, accessing stored motion information for at least one other block of data, based on the stored motion information, generating a list of one or more motion vector predictor candidates for the input block in accordance with an adaptive list construction order, and predicting a motion vector for the input block based on at least one of the one or more motion vector predictor candidates.

In general, in a twenty-first aspect combinable with the twentieth aspect, the encoder is configured to perform motion compensation based on the at least one of the one or more motion vector predictor candidates to produce a predicted block for the input block, compare the input block and the predicted block to determine a residual, and select the at least one of the one or more motion vector predictor candidates for the input block in response to the residual satisfying a threshold value In general, in a twenty-second aspect combinable with the twentieth or twenty-first aspects, the input block is part of a current frame, and the encoder is configured to: identify a plurality of reference frames for the current frame, determine a score for each of the plurality of reference frames based at least in part on a temporal distance between the current frame and the respective reference frame, and based on the score, prioritize the plurality of reference frames.

In general, in a twenty-third aspect combinable with any of the twentieth through twenty-second aspects, determining the score for each of the plurality of reference frames is based at least in part on a pixel quality of at least a portion of the respective reference frame.

In general, in a twenty-fourth aspect combinable with any of the twentieth through twenty-third aspects, determining the score for each of the plurality of reference frames is based at least in part on whether a motion vector associated with the respective reference frame crosses the current frame.

In general, in a twenty-fifth aspect combinable with any of the twentieth through twenty-fourth aspects, the encoder is configured to generate, based on the stored motion information, a projected motion vector from the current frame to a first reference frame of the plurality of reference frames, and assign a priority to the projected motion vector based at least in part on the score of the first reference frame.

In general, in a twenty-sixth aspect combinable with any of the twentieth through twenty-fifth aspects, the projected motion vector is a first projected motion vector, and the encoder is configured to generate a second projected motion vector from the current frame to a second reference frame of the plurality of reference frames, in which the second reference frame has a lower score than the first reference frame, and in which the first projected motion vector is not allowed to be overwritten by the second projected motion vector due to the second reference frame having a lower score than the first reference frame.

In general, in twenty-seventh aspect combinable with any of the twentieth through twenty-sixth aspects, the at least one other block is a previously coded block having been coded using inter uni-prediction, and the stored motion information includes a motion vector with a backward reference.

In general, in a twenty-eighth aspect combinable with any of the twentieth through twenty-sixth aspects, the at least one other block is a previously coded block having been coded using intra prediction, and the stored motion information includes a projected motion vector.

In general, in a twenty-ninth aspect combinable with any of the twentieth through twenty-eighth aspects, the encoder is configured to: determine that the motion information for the at least one other block includes linear motion, determine that a temporal distance between a frame associated with the at least one other block and a frame associated with the input block satisfies a threshold value, and increase a priority of a motion vector predictor candidate associated with the at least one other block in the list of the one or more motion vector predictor candidates based on the determination that the motion information includes linear motion and the determination that the temporal distance satisfies the threshold value.

In general, in a thirtieth aspect combinable with any of the twentieth through twenty-ninth aspects, the input block and the at least one other block are part of a same frame, and the encoder is configured to: determine that a reference frame of the at least one other block is different from but in the same direction as a reference frame of the input block, and responsive to the determination, apply a scaling algorithm to the motion information for the at least one other block to generate a motion vector predictor for the input block.

In general, in a thirty-first aspect combinable with any of the twentieth through thirtieth aspects, the input block is coded in an inter uni-prediction mode.

In general, in a thirty-second aspect combinable with any of the twentieth through thirty-first aspects, the encoder is configured to: access stored motion information for at least two other blocks of data, the at least two other blocks and the input blocks of data being part of a same frame, determine that a reference frame for each of the at least two other blocks is different from a reference frame of the input block, and responsive to the determination, combine the motion information for the at least two other previously coded blocks of data to generate a motion vector predictor for the input block.

In general, in a thirty-third aspect combinable with any of the twentieth through thirty-second aspects, the input block is coded in a bi-predictive or multi-hypothesis inter prediction mode.

In general, in a thirty-fourth aspect combinable with any of the twentieth through thirty-third aspects, the input block is a first block of a first tile row, and the encoder is configured to store the list of one or more motion vector predictor candidates for the input block as a list of one or more motion vector predicator candidates for a first block of a second tile row.

In general, in a thirty-fifth aspect combinable with any of the twentieth through thirty-fourth aspects, the encoder is configured to: downsampling a motion field associated with the input block to produce a downsampled motion field, and store the downsampled motion field in memory.

In general, in a thirty-sixth aspect combinable with any of the twentieth through thirty-seventh aspects, the encoder is configured to: quantize the one or more motion vector predictor candidates to produce quantized motion vector predictor candidates, and store the quantized motion vector predictor candidates in memory.

In general, in thirty-seventh aspect, a method for encoding data includes performing the operations of any of the twentieth through thirty-sixth aspects.

In general, in a thirty-eighth aspect, a non-transitory computer-readable medium stores instructions which, when executed by at least one processor, cause the at least one processor to perform the operations of any of the twentieth through thirty-sixth aspects.

The details of one or more implementations are set forth in the accompanying drawings and the description below. Other features and advantages will be apparent from the description and drawings, and from the claims.

BRIEF DESCRIPTION OF DRAWINGS

FIGS. 11 and 12 illustrate diagrams of an example motion vector list construction.

Like reference symbols in the various drawings indicate like elements.

DETAILED DESCRIPTION

The techniques described here enhance motion vector prediction and coding efficiency by leveraging the spatial and temporal correlation among motion information in coding sequences. In particular, the techniques described here can better utilize the projected temporal motion vector prediction (TMVP) motion field by enabling both forward (past) motion information and backward (future) motion information to be stored for the coding and prediction of future frames. In addition, more spatial motion vector predictions (SMVPs) are generated through relaxation of the limitations in various inter prediction modes, thereby improving access to SMVPs for prediction and reducing the burden on hardware (e.g., line buffers). In some examples, coding efficiency is further improved through adaptive reference frame selection and motion vector candidate scanning order, and memory requirements for the storage of additional motion information are reduced through selective storage techniques.

Figure 1A:
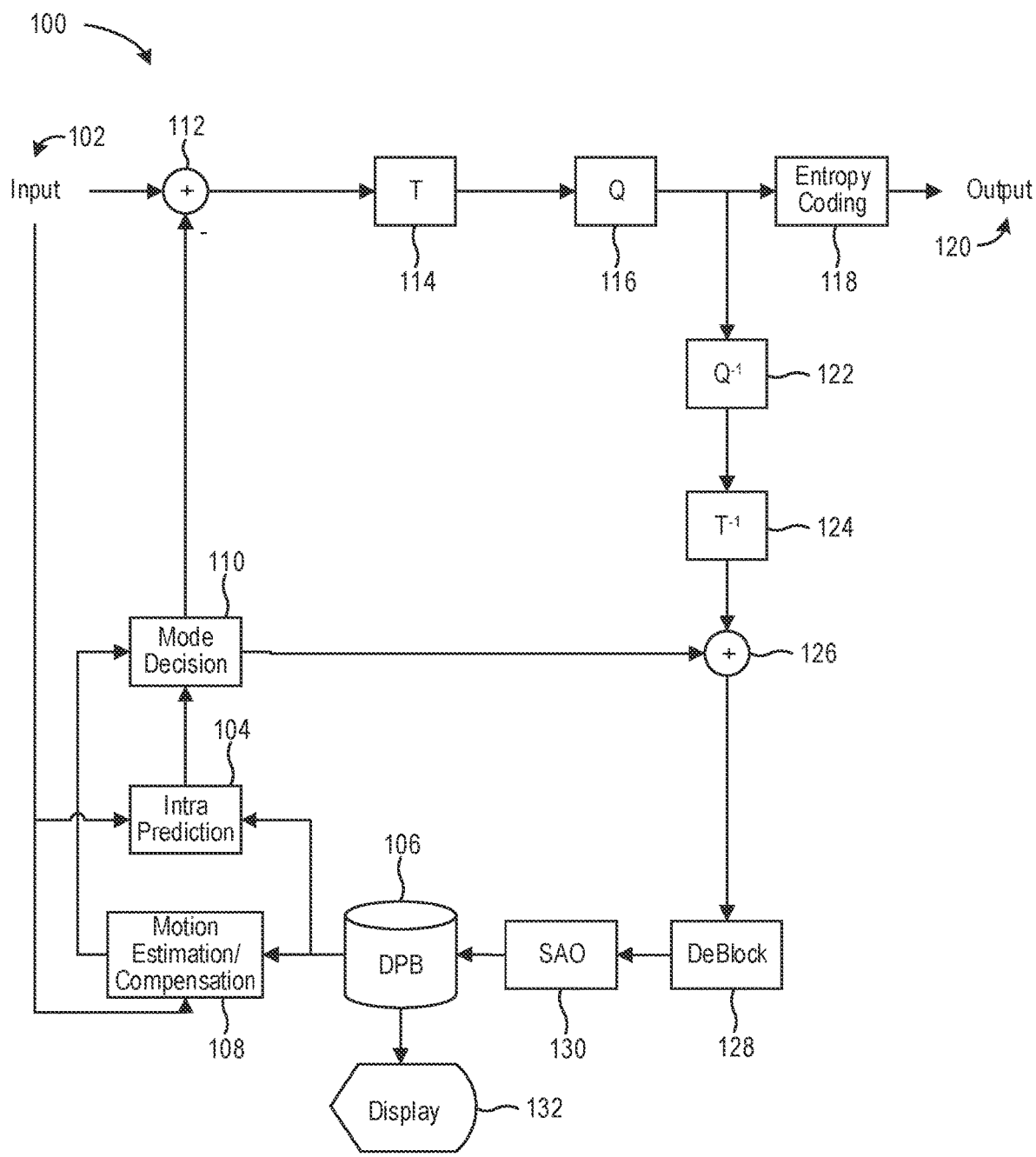
FIG. 1A illustrates a block diagram of an example encoder.

FIG. 1A illustrates a block diagram of an example encoder 100 in accordance with an aspect of the present disclosure. In operation, the encoder 100 receives input data 102 to be encoded, such as data corresponding to an image or video frame. In some examples, the input data 102 is data corresponding to a portion of an image or video frame, such as a portion of the pixels or samples that make up the image or video frame (sometimes referred to as a block or coding unit), that has been partitioned (e.g., by the encoder 100 or in a separate pre-processing step) for encoding. The techniques described here also apply to the coding of other input data 102, such as 3D data including point clouds, three (or more) degrees of freedom information, mesh information, or other information that may use video coding methods as part of their compression process (e.g., in the context of the V3C/V-PCC coding standards recently developed by MPEG). In addition, although some of the techniques described here are discussed in the context of an encoder, the techniques can be applied by a decoder in some examples (or vice versa).

To encode the input data 102, the encoder 100 can apply one or more predictive coding techniques, such as intra prediction or inter prediction (motion compensation), or both, among other techniques. For instance, in intra prediction, an intra predictor 104 can select an intra prediction mode that is best suited for the prediction of the input data 102 (or a block thereof) according to predefined criteria (e.g., rate-distortion optimization). In general, the intra predictor 104 can select any mode supported by a particular implementation of the encoder 100, such as a vertical, horizontal, angular, planar, DC, position-dependent prediction combination (PDPC), palette, intra block copy, or matrix-based intra prediction mode, among others. The intra predictor 104 can use the selected mode to generate a prediction for the input data 102 based on neighboring samples in previously coded blocks (e.g., blocks in the reference frames stored in the decoded picture buffer (DPB) 106).

In inter prediction, a motion estimator/compensator 108 can predict coding blocks for the input data 102 using one or more matching blocks in the reference frames stored in the DPB 106. To do so, the motion estimator/compensator 108 can use a motion estimation process which determines the appropriate prediction parameters (e.g., motion vectors) that indicate the motion of samples within the coding blocks with respect to the matching blocks in the reference frames. In some examples, prediction is based on a translational model, however, more advanced models such as affine, parametric, or parabolic, among others, can also be used. Once the prediction parameters have been determined, the motion estimator/compensator 108 can employ a motion compensation/prediction process which utilizes the prediction parameters to generate the prediction signal for each coding block (and, thus, the input data 102). In some examples, weighted prediction/illumination compensation may also be used where the predictors from one or more references are first appropriately weighted before being combined to generate the final prediction. Although shown as a single unit, in some examples the motion estimator/compensator 108 can be implemented as separate motion estimation and motion compensation units.

In general, the motion compensation based inter predictive coding techniques applied by the motion estimator/compensator 108 can remove the temporal redundancy of data (e.g., pixels, blocks, etc.) in successive frames. It can also remove inter-layer and/or spatial redundancy when utilized for scalable coding, intra block copy prediction, or for fractal based image/video coding. However, some inter prediction approaches may need to signal multiple pieces of motion information per coding block, including reference frame indices, motion models, and motion vectors. This increased side information can reduce the possible performance gains brought by inter prediction. Motion information can cause significant signaling overhead and can account for large portions of the final bitstream.

To reduce the overhead of the signaling of motion information, spatial motion vector prediction (SMVP) and temporal motion vector prediction (TMVP) techniques can be used to improve the coding efficiency of motion information. SMVP exploits the fact that the motion information (e.g., in video sequences) may have strong correlation with its spatial neighbors. Therefore, the motion information of the neighboring blocks/pixels can be utilized as a predictor for the motion information of the current block/pixel to reduce motion information redundancies. TMVP exploits the strong temporal correlation that can exist between motion information from successive frames. In particular, the motion information from reference frames can be utilized to improve motion vector prediction and therefore the coding efficiency of the blocks/pixels in the current frame. It should be noted that in instances where scalable or multi-view coding is utilized, the TMVP may correspond to motion information from an earlier coded version of the current picture/view.

Through the improved motion vector prediction techniques described here, the motion estimator/compensator 108 can provide a good initial candidate for motion estimation and reduce the complexity of the encoder 100. For example, the motion estimator/compensator 108 can select the best motion vector predictor from the improved motion vector predictors described here, and then run motion compensation based on the motion vector predictor to derive a prediction of the current block. If the residual between the current block and its prediction is smaller than a threshold, then a mode decision engine 110 (or another component of the encoder 100) can terminate the motion search early and reduce the time complexity. With the improved motion vector prediction described here, the chance of early termination occurring is increased. The mode decision engine 110 can also use the improved motion vector prediction to reduce the redundancy of side information for motion vectors. If the rate-distortion of a mode is below a threshold, the mode decision engine 110 can terminate the motion search process early instead of continuing to try other modes, thus further reducing the time complexity.

To generate the residual between the current block and its prediction, an adder/subtractor 112 can be used to take the difference between the input data 102 and the prediction of the input data 102 generated by the intra predictor 104 or the motion estimator/compensator 108. The residual can be passed to a transformation engine 114 to be transformed (e.g., by a discrete cosine transform (DCT), a discrete sine transform (DST), a Walsh-Hadamard transform, a Haar transform, or a Daubechies wavelet transform, among others), and a quantization engine 116 to be quantized in accordance with a quantization parameter. The resultant residual data (e.g., the quantized transform coefficients) can be coded by an entropy coder 118 to produce a compressed output bitstream 120. Headers and control data (e.g., signaling information, including the motion vector predictor information described here) can also be included in the bitstream to facilitate reconstruction at the decoder. The encoder 100 can store the output 120 (e.g., using a computer-readable storage medium) and/or provide the output 120 to a decoder (e.g., the decoder 150 of FIG. 1B) in real or near-real time over a communication channel (e.g., a wired or wireless network or any other suitable channel to receive the encoded bitstream).

The encoder 100 can also incorporate a reconstruction process. For example, an inverse quantization engine 122 and an inverse transformation engine 124 can invert the operations of the transformation engine 114 and the quantization engine 116 to reconstruct the residual. The reconstructed residual can be combined with the prediction (e.g., by an adder 126) to reconstruct the input data 102. One or more filters, such as a deblocking filter 128 and sample adaptive offset (SAO) 130, among others, can also be applied in a cascaded fashion to the reconstructed input data to improve the quality of the reconstruction by, for example, mitigating any discontinuities or other artifacts that may not be compensated through or could be an outcome of the residual coding process. The reconstructed input data can be stored in a DPB 106 as a reference picture/frame for the prediction of subsequent frames to be coded. In some examples, the reconstructed data can be provided to a display 132 for visualization.

Figure 1B:
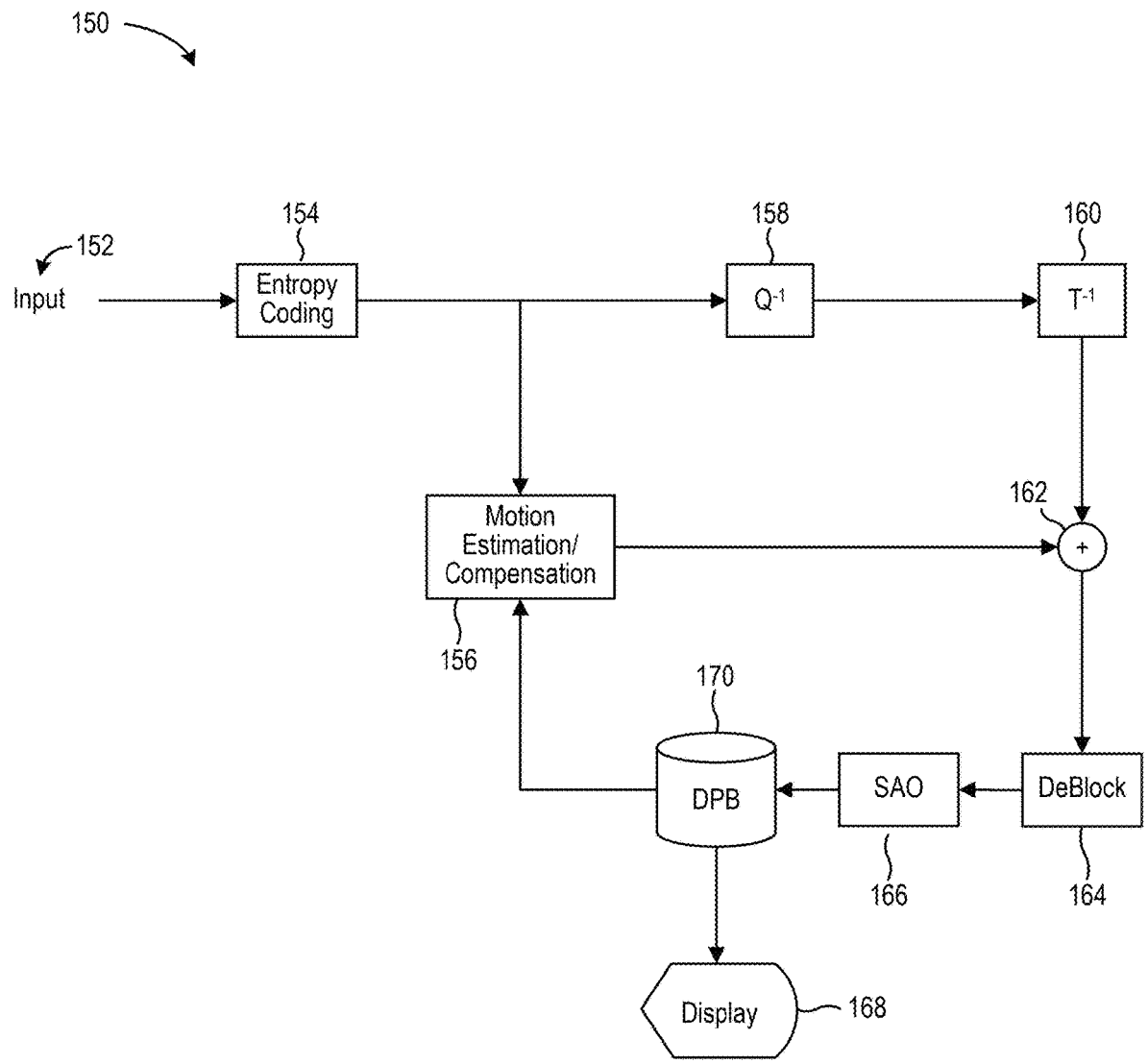
FIG. 1B illustrates a block diagram of an example decoder.

Referring to FIG. 1B, a decoder 150 can receive the encoded bitstream from the encoder 100 as an input 152 and can process the bitstream to reconstruct the encoded bitstream (e.g., reconstruct the samples corresponding to the input data 102). In particular, an entropy decoder 154 can parse and decode the bitstream to generate decoded data, which may include quantized and transformed residual data, motion vector data, reference frame indices, prediction data, control data, and any other metadata for reconstructing the samples. A motion compensator/intra predictor 156 can generate a prediction based on previously decoded samples stored in a DPB 170 using the motion vectors, reference frame indices, and other information associated with the block and the prediction process, such as illumination compensation and prediction filtering parameters, or indicated in the coded data. An inverse quantization engine 158 and an inverse transformation engine 160 can process the decoded data to generate a residual that can be combined with the prediction by an adder 162 to generate a reconstructed frame. One or more filters, such as a deblocking filter 164, SAO 166, ALF, directional filter, among other filters can be applied to the reconstructed frame to improve the quality of the reconstructed samples. The reconstructed frame can be stored with other decoded frames in the DPB 170 to predict and reconstruct subsequent frames to be decoded and for output of the reconstructed picture, such as to storage device or a display 168.

Exploiting the Projected TMVP Motion Field

Figure 2:
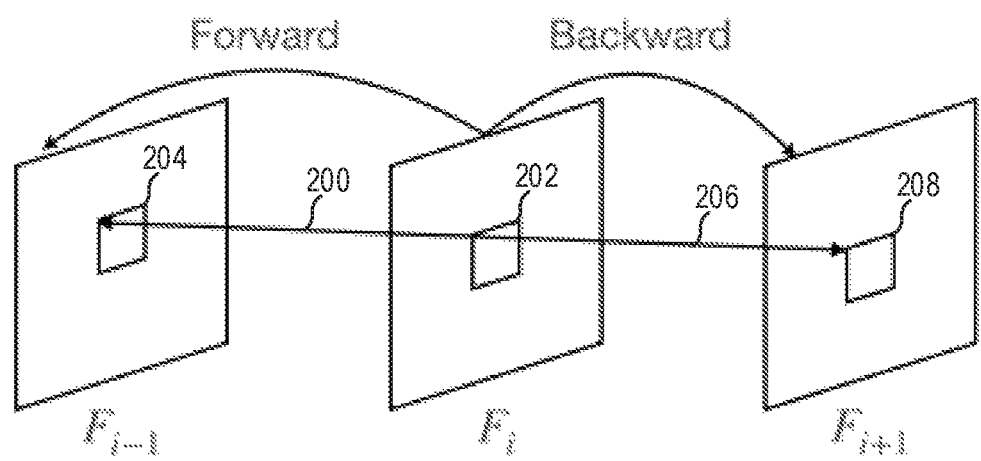
FIG. 2 illustrates a diagram of prediction direction.

In general, TMVP uses motion information from one or more reference frames to predict a motion vector for a block of a current frame. In this context, forward motion information refers to motion information (e.g., a motion vector and a reference frame index) associated with a block of a frame that points to a reference frame that precedes it in time. For example, referring to FIG. 2, forward motion information can include a motion vector 200 associated with a block 202 of frame $F_i$ that points to a corresponding (e.g., co-located) block 204 in reference frame $F_{i-1}$. On the other hand, backward motion information refers to motion information associated with a block of a frame that points to a reference frame that follows it in time. In the example of FIG. 2, backward motion information can include a motion vector 206 associated with the block 202 of frame $F_i$ that points to a corresponding block 208 in reference frame $F_{i+1}$.

Figure 3:
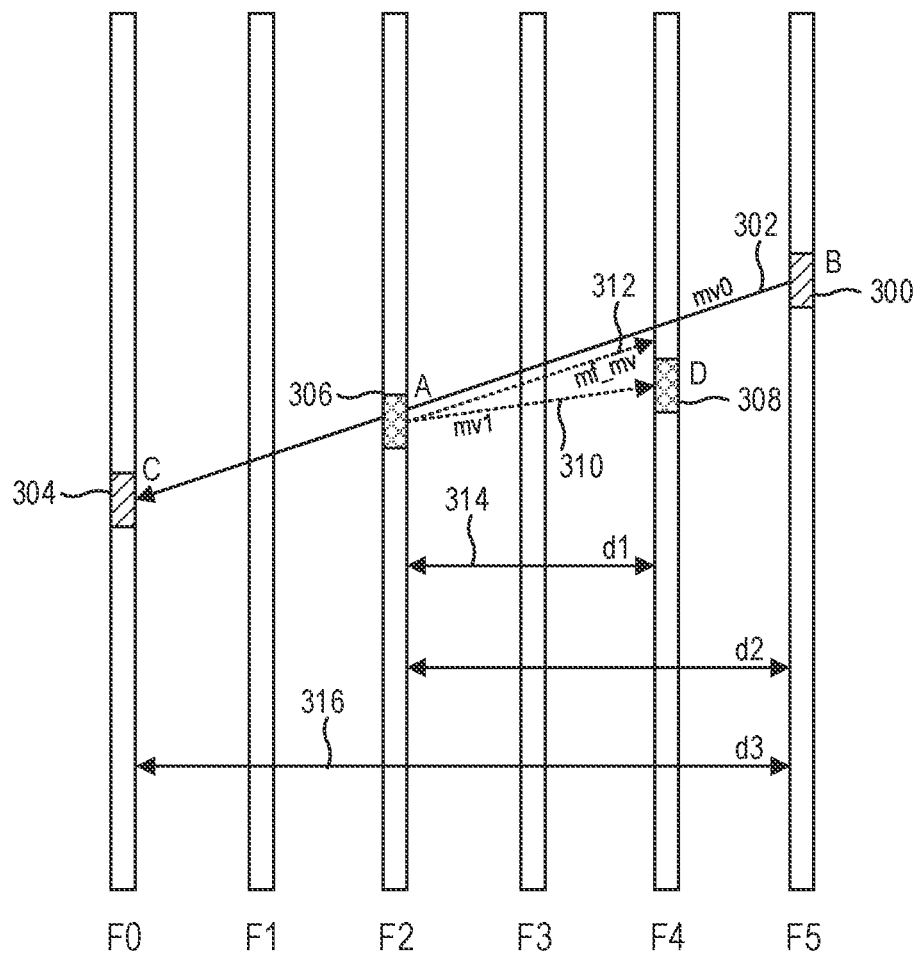
FIG. 3 illustrates a diagram of temporal motion vector prediction (TMVP) using a forward motion vector.

FIG. 3 illustrates an example of TMVP in accordance with the design of some video coding systems. In this example, frame $F_2$ is currently being coded, and frame $F_5$ is one of the reference frames used for the coding of frame $F_2$. Block B (300) in frame $F_5$ is associated with a forward motion vector $mv_0$ (302) that points to a corresponding reference block C (304) in frame $F_0$. Also assume that block A (306) in frame $F_2$ relates to a reference block D (308) in frame $F_4$ according to a motion vector $mv_1$ (310). In this example, the projected motion vector mf_mv (312) can be derived as a predictor of motion vector $mv_1$ (310) based on the distance $d_1$ (314) between the current frame $F_2$ and its reference frame $F_4$, the distance $d_3$ (316) between frame $F_5$ and its reference frame $F_0$, and the motion vector $mv_0$ (302).

However, some video coding systems may only consider forward motion information as part of the TMVP process for subsequently coded frames. Thus, if a block is coded in an inter prediction mode (e.g., uni-prediction) with a backward reference, then its motion information may be unavailable for TMVP of future frames. Similarly, if a block is coded using intra prediction, then a projected motion vector that could have otherwise been associated with the block may be unavailable for TMVP of future frames.

Figure 4:
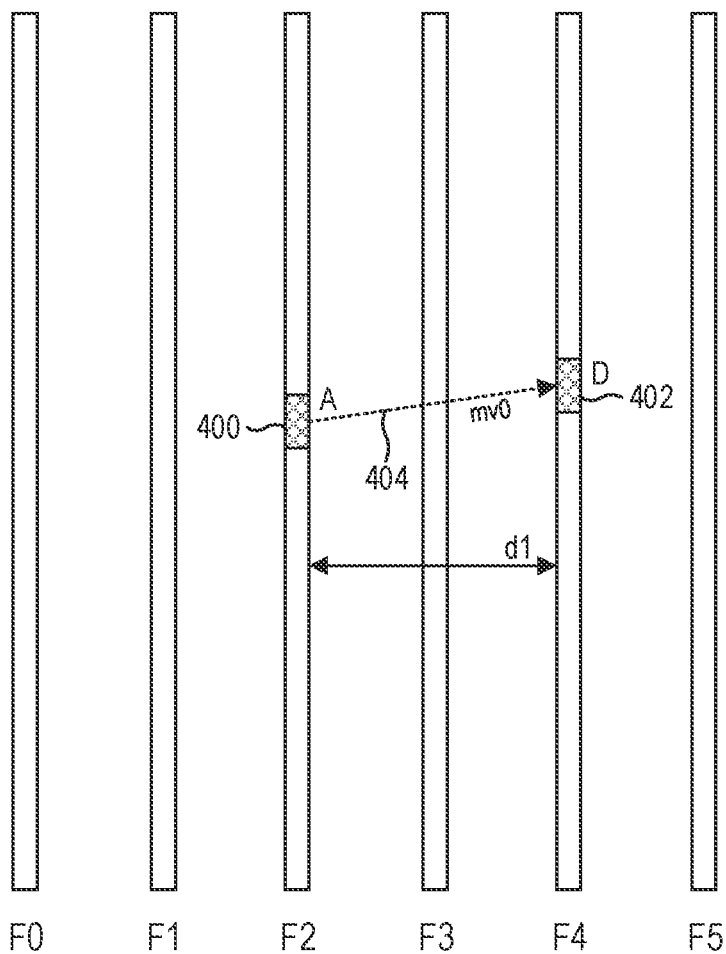
FIG. 4 illustrates a diagram of inter uni-prediction with a backward reference.
Figure 5:
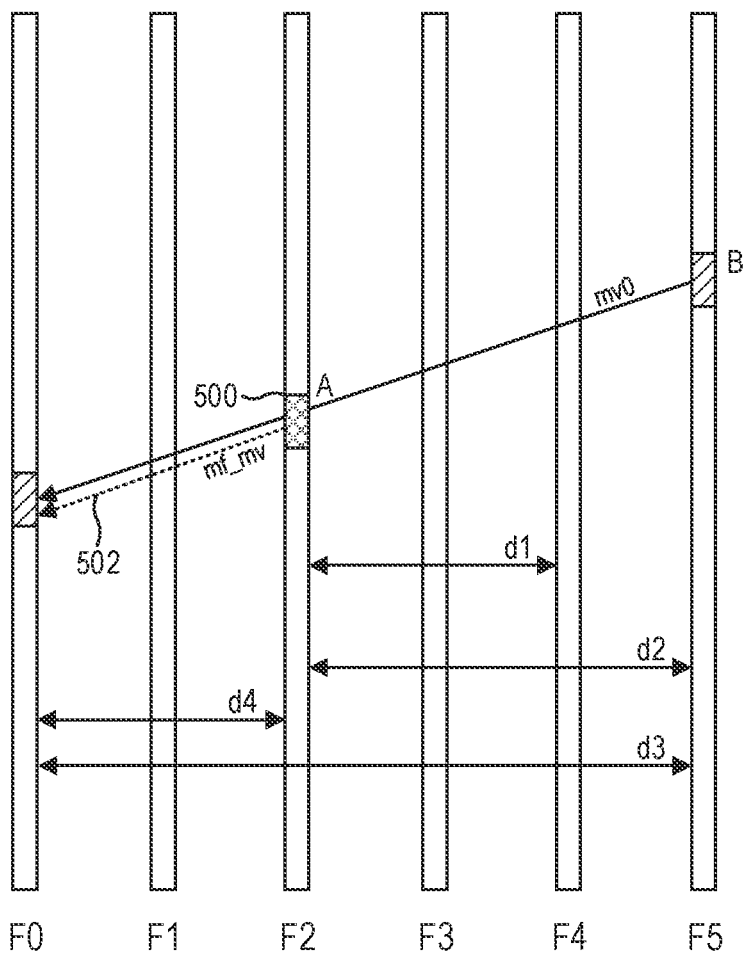
FIG. 5 illustrates a diagram of intra prediction.

To improve coding efficiency and prevent motion vector prediction holes (e.g., blocks that lack any motion vector predictors), the motion information associated with a block coded using intra prediction and/or inter prediction with a backward reference can be stored and used by an encoder or decoder in the TMVP process for subsequently coded frames. For example, referring to FIG. 4, if a current block A (400) in frame $F_2$ is coded in an inter uni-prediction mode with a backward reference to a block D (402) in frame $F_4$, then its motion vector $mv_0$ (404) (and other motion information) can be stored for use in TMVP of future frames (e.g., frame $F_3$). In addition, if a block A (500) in current frame $F_2$ is coded in an intra prediction mode as shown in FIG. 5, then a projected motion vector mf_mv (502) that is associated with the position of block A will be stored for TMVP of future frames. For example, the projected motion vector mf_mv (502) associated with block A (500) can be used as a predictor for a block in frame $F_1$ that is coded after the coding of $F_2$. In this manner, both the forward and backward motion information for a block can be stored and made available for future frame TMVP regardless of the coding technique used, thereby increasing the overall coding efficiency.

In some examples, a similarity check can be included in the coding process to further improve coding efficiency. For example, a similarity check such as the sum of absolute differences (SAD), sum of square errors (SSE), mean square error (MSE), root mean square error (RMSE), structural similarity index measure (SSIM), or combinations of them, among others can be conducted between the current block and its spatially neighboring blocks, and the motion vectors of the most similar blocks could be used as motion vector prediction candidates for the current block (e.g., if the current block is coded in an intra prediction mode). Then, the motion vector prediction candidates from the derived spatial neighbors and the temporal projected candidates can be considered as predictors for the motion vector in a future frame. Alternatively, a rate-distortion optimization (RDO) process could be used to determine which derived motion vector prediction candidates should be used. The index of the selected motion vector prediction candidates can then be signaled to the decoder.

It should be noted that in coding systems that use multiple motion vector lists, including those that do not identify direction (e.g., MPEG video coding specifications such as AVC, HEVC, or VVC), all of the motion vector lists can be stored for motion vector prediction. In such cases, gaps in the motion vector field for any list could also be filled by utilizing spatial or temporal motion vector candidates. An available motion vector from another list, and its own relationship to its own motion vector predictors, could also be used to generate a motion vector predictor for the current list. For example, if the motion vector for a list is equal to its predictors, then there is a high likelihood that the motion vector corresponding to another list will be equal to its predictors. Although it is possible that a motion vector was not ultimately used due to, e.g., the coding decision process, and therefore may not have been signaled, such a motion vector may still be a useful predictor for subsequent decisions.

Prioritizing TMVP Reference Frames

In general, if the temporal distance between two frames is small, a strong temporal correlation may exist between them. Similarly, in inter prediction, if the frame being coded is located between two reference frames (e.g., interpolation), then the motion from these two reference frames can be more accurate than the motion from two reference frames which are located on the same side of the current frame (e.g., extrapolation). Moreover, some frames may be coded with a higher quality relative to other frames, such as key frames or ALTREF frames in the context of AV1, or higher level frames in a hierarchical structure compared to frames in lower levels of the hierarchy. Quality may also vary spatially because of adaptive quantization methods or rate control schemes, or due to variations in features such as quantization, rate distortion optimized quantization, coefficient thresholding, quantization rounding, or combinations of them, among others. Thus, the quality of the reference frames and the prediction blocks used for TMVP can vary.

To improve the reliability and accuracy of the motion prediction process, the reference frames used for TMVP generation can be prioritized based on one or more of the temporal distance, inter prediction coding type (e.g., interpolation or extrapolation), and reference pixel quality (e.g., as indicated by the quantization parameter (QP) of the reference frame, region, or block). In some examples, prioritization may also depend on motion type (translation, zoom, rotation, affine, etc.), motion magnitude, spatial resolution difference, spatial signal characteristics (spatial texture or smooth region), or combinations of them, among others.

To prioritize the reference frames and provide for an adaptive motion prediction order, a score can be assigned to each reference frame based on the temporal distance, inter prediction type, and pixel quality, among others. For example, a higher score can be assigned to a reference frame having a smaller temporal distance to the current frame relative to a reference frame having a larger temporal distance to the current frame. As another example, a higher score can be assigned to reference frames that can be used for interpolation relative to reference frames that are only suitable for extrapolation. As yet another example, a higher score can be assigned to a reference frame having higher pixel quality relative to a reference frame having a lower pixel quality, especially if the two frames have the same temporal distance. The reference frames can then be ranked, ordered, and processed by an encoder or decoder based on the assigned score.

The motion from high priority reference frames can potentially result in more accurate TMVPs. Accordingly, in some examples, the projected motion vectors from higher priority reference frames are assigned a higher priority than projected motion vectors from lower priority reference frames if multiple motion projections exist in the same position. In some examples, higher priority motion vectors cannot be overwritten by the motion vectors from lower priority reference frames. In this manner, better motion vector prediction can be achieved, thereby improving coding efficiency. The priority can be determined based on some or all of the motion information that corresponds to the same location, using techniques such as weighted averaging, majority voting, linear or non-linear (e.g., median) filtering, machine learning methods, or combinations of them, among others.

In some video coding standards, such as AV1, only a single motion candidate is considered, and it is possible that a projected motion vector from a lower priority reference frame is used to overwrite the projected motion vector from a higher priority reference frame. Such designs reduce the motion vector predictor coding efficiency. Below is a non-limiting example of how the TMVP is generated in the context of AV1:

Scan Order: LAST_FRAME, BWDREF_FRAME, ALTREF2_FRAME, ALTREF_FRAME, LAST2_FRAME

Maximum allowed number of predictors: 3

Overwrite Rule: The motion vector from the reference frame of a later position in scanning order will overwrite the previous motion vector In accordance with the techniques described here, multiple (e.g., backward and forward) motion vectors associated with a reference frame can be considered for TMVP. In some examples, backward motion vectors (e.g., for the previous frame) can be assigned a higher priority in the scan order such that they are considered before forward motion vectors (e.g., for the previous frame). As a non-limiting example, the TMVP may be generated as follows in the context of AV1:

Scan Order: LAST_FRAME (BACKWARD MVs), BWDREF_FRAME, ALTREF2_FRAME, LAST_FRAME (FORWARD MVs), ALTREF_FRAME, LAST2_FRAME Overwrite Rule: The motion vector from a higher indexed reference frame shall not overwrite the motion information assigned by a lower indexed reference frame. If in the existing projected positions a large region has the same motion vectors from all possible candidates, or such candidates point to approximately the same position, then a new motion vector corresponding to a small prediction block size should not overwrite the existing projected motions as it may indicate that these blocks in the large region with the similar motion vectors are from the same object and have high correlation. Alternatively, if the new motion vector is from a neighboring large region, then it can have a higher priority than the existing projected motion vector, which is projected from a small block. This may also be impacted by the quality of said block (e.g. a candidate with a lower QP may be given a higher priority).

Adaptive TMVP motion projection order can be achieved by ranking the score of each reference frame using a function of the form:

Score=f(temporal distance, interpolation/extrapolation, pixel quality, light change, occlusion/disocclusion)

In an essence, the score can be modeled as a function of, but is not limited to, temporal distance, interpolation/extrapolation, pixel quality, light change, and occlusion/disocclusion. The function can be, but is not limited to, a linear and non-linear model, a decision tree function, a neural network, a support vector machine (SVM) model, etc. For error resiliency, once the order is decided based on the score value, the order can be explicitly signaled to the decoder. This signaling can be done at frame, tile, or slice level, among others. In some examples, the decoder uses the techniques described above to derive the order, thereby reducing complexity and signaling overhead. In some examples, a hybrid approach is used in which the decoder derives the order based on the score computation and modifies the order based on altering parameters signaled by the encoder. For example, the encoder may determine that the score computation results in an inaccurate or sub-optimal order, and can signal one or more alterations to the order that can be applied by the decoder after derivation. Such altering parameters can include delta values or some other indicator of a desired alteration to the order (e.g., an indication to switch the second reference in the order with the third reference in the order, or vice versa). In this manner, an appropriate balance between error resiliency and complexity can be achieved.

Improving Spatial Motion Vector Prediction

As mentioned above, a strong correlation can exist between pixels within an image. As such, the motion vectors from neighboring blocks can be exploited as predictors of the motion vector(s) of the current block to improve coding efficiency.

Figure 6A:
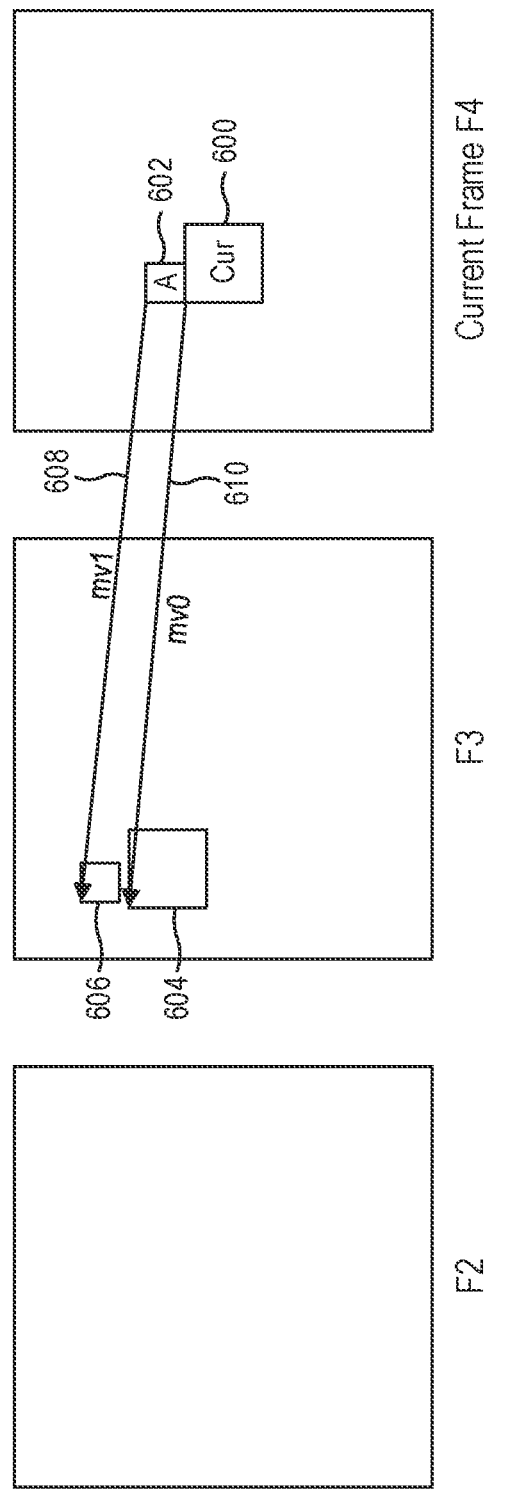
FIGS. 6 through 9 illustrate diagrams of examples of spatial motion vector prediction.
Figure 6B:
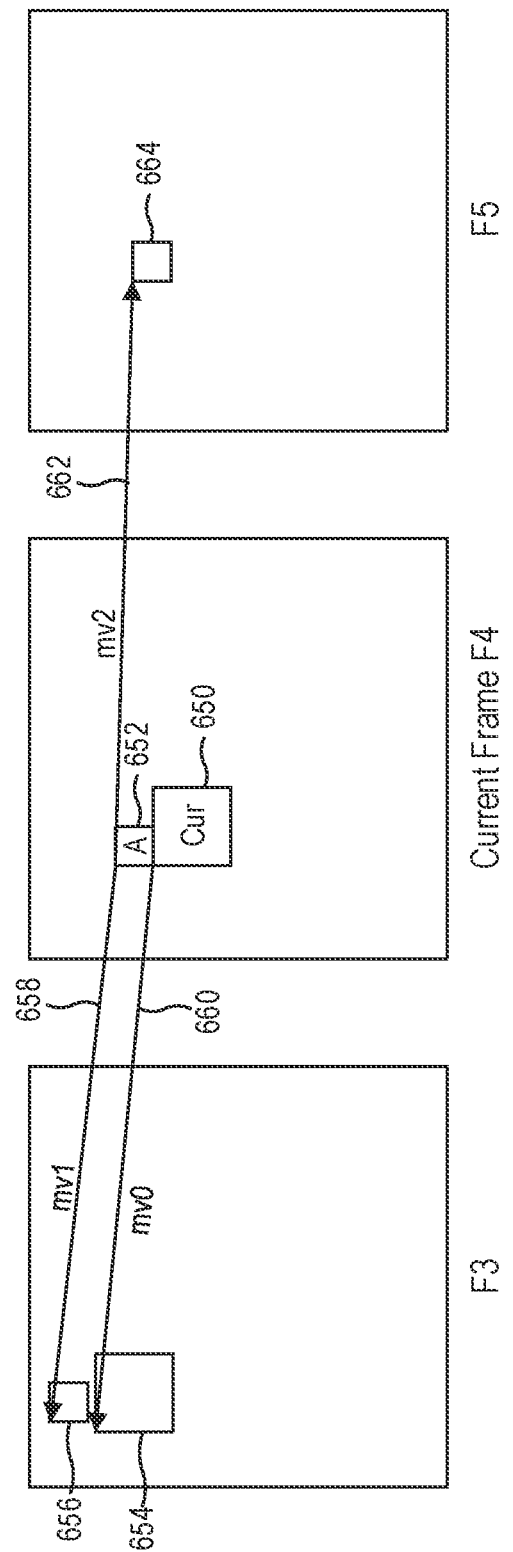

In some video coding standards, use of the motion vectors of neighboring blocks as the predictor of the motion vector of the current block is limited. For example, in the AV1 standard, if the current block is coded in an inter uni-prediction mode, then the motion vector of a neighboring block can be used as a predictor of the motion vector of the current block only when they have the same reference frame. For example, in FIG. 6A, the current block 600 and its neighboring block 602 in current frame $F_4$ each point to corresponding blocks 604, 606 in the same reference frame $F_3$. Accordingly, a motion vector $mv_1$ (608) associated with the neighboring block 602 can be used as a predictor for the motion vector $mv_0$ (610) associated with the current block 600. Similarly, in FIG. 6B, the current block 650 and its neighboring block 652 each point to corresponding blocks 654, 656 in the same reference frame $F_3$, and thus the motion vector $mv_1$ (658) associated with the neighboring block 652 can be used as a predictor for the motion vector $mv_0$ (660) associated with the current block 650. However, the motion vector $mv_2$ (662) that points from the neighboring block 652 to a corresponding block 664 in frame $F_5$ cannot be used as a predictor for the motion vector of the current block 650 under the AV1 standard because the current block 650 does not include frame $F_5$ as a reference frame.

Figure 7:
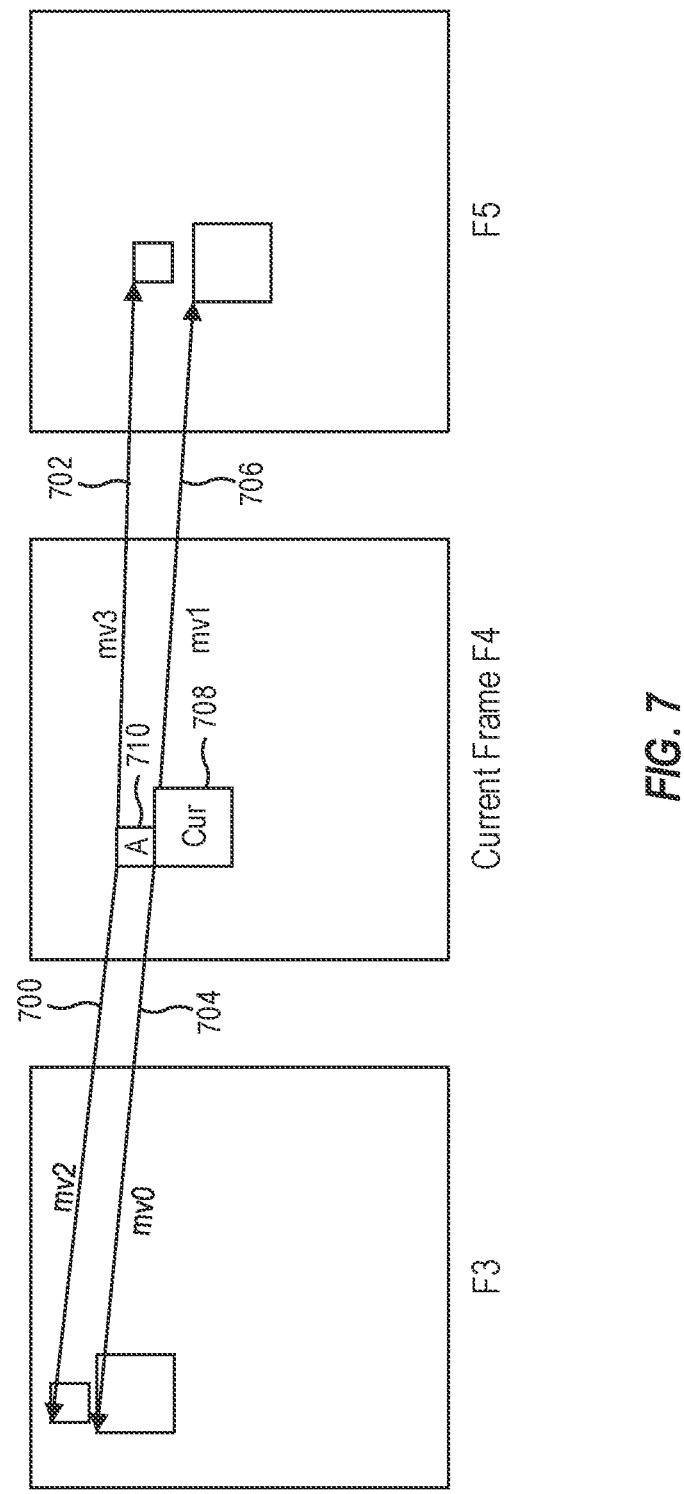

The AV1 standard also provides that if the current block is coded using a bi-predictive or multi hypothesis inter prediction mode, then the motion vectors of neighboring blocks can be used as predictors of the motion vector of the current block only if the two reference frames of the current and neighboring block are the same. For example, in FIG. 7, each of the motion vectors $mv_2$ (700) and $mv_3$ (702) can be used as predictors of the motion vectors $mv_0$ (704) and $mv_1$ (706), respectively, because the current block 708 and the neighboring block 710 share the same reference frames. In any other case, the motion vector of neighboring blocks cannot be used as the predictor of the motion vector of the current block under the AV1 standard.

Figure 8:
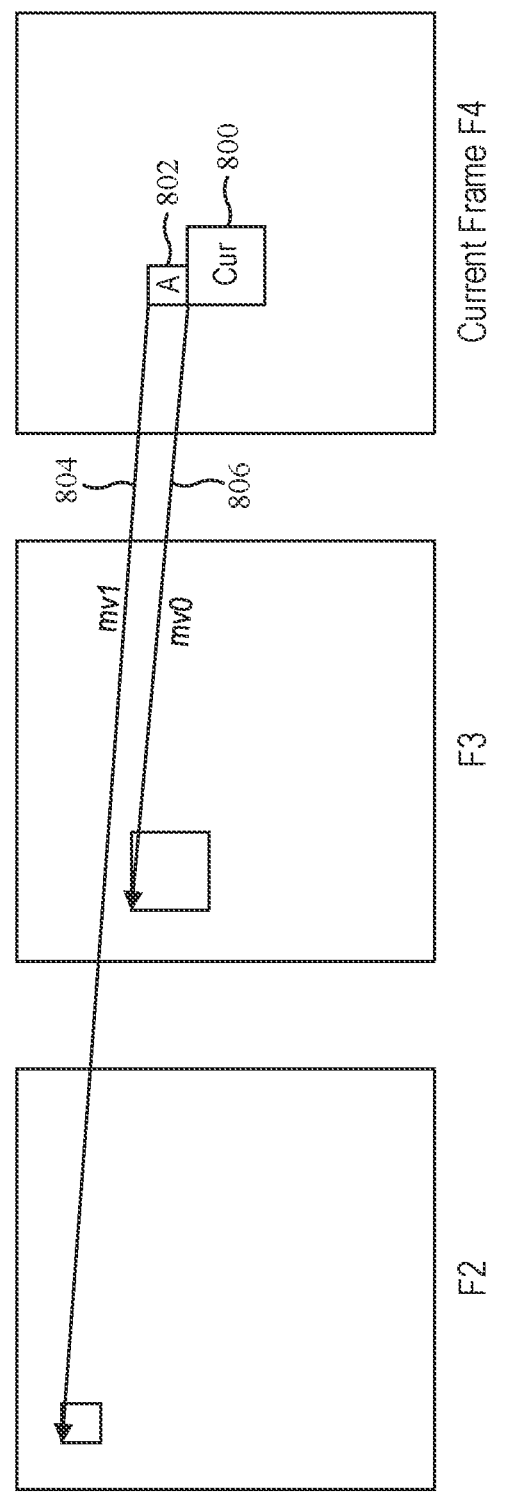

To improve coding efficiency, the techniques described here allow for more relevant and accurate spatial motion vector predictors to be generated based on the motion vectors of neighboring blocks, especially when such motion vectors could not be generated previously because of constraints imposed on the motion vector predictor generation process. For example, if the current block is coded in an inter uni-prediction mode, and if its reference frame is different from, but in the same direction as, the reference frame(s) of its neighboring block(s), then a mapping algorithm can be used to derive the motion vector prediction for the current block. For example, referring to FIG. 8, block 800 is the current coding block in current frame $F_4$. The reference frame of the current block 800 is frame $F_3$, which is different from the reference frame $F_2$ of neighboring block 802. In some video coding standards (e.g., AV1), the motion vector $mv_1$ (804) of the neighboring block 802 cannot be used as a predictor for the motion vector $mv_0$ (806) of the current block 800 even though $mv_1$ (804) may provide a good prediction for $mv_0$ (806) after temporal scaling. In accordance with the techniques described here, a mapping algorithm (e.g., temporal scaling, warping, and etc.) can be utilized to derive the predictor of motion vector $mv_0$ based on the temporal distance, block-level and/or frame quality (e.g. QP), and the motion information (e.g., motion vector $mv_1$) associated with the neighboring block 802.

Figure 9:
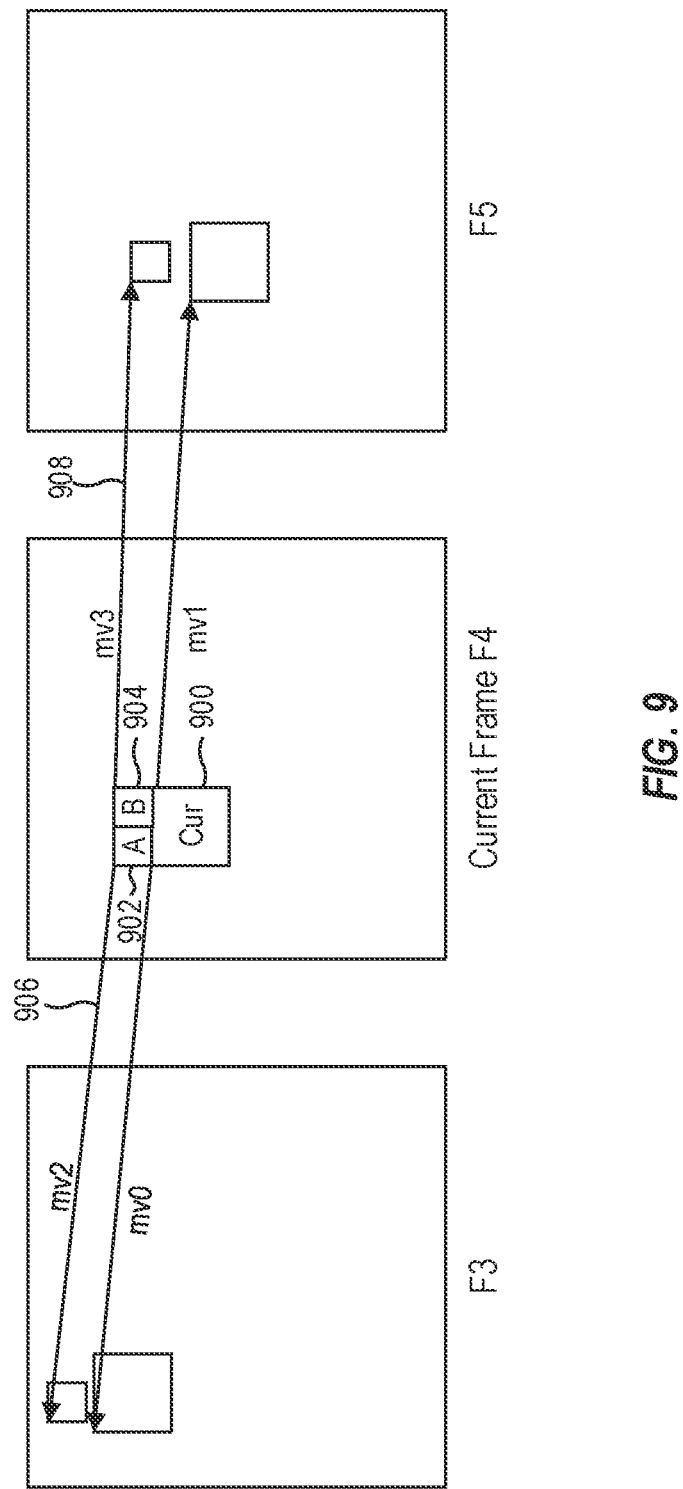

As another example, if the current block is coded in a bi-predictive or multi hypothesis inter mode and its reference frames are different from the reference frames of its neighboring blocks, the combination of the motion vectors from different neighboring blocks can be exploited to derive the motion vector predictor of the current block. For example, as shown in FIG. 9, the current block 900 in the currently coded frame $F_4$ is coded in a bi-predictive inter mode, and its reference frames are frames $F_3$ and $F_5$. The neighboring blocks 902, 904 are coded using inter uni-prediction modes, and their reference frames are frames $F_3$ and $F_5$, respectively. In some video coding standards (e.g., AV1), neither the motion vector $mv_2$ (906) of block 902 nor the motion vector $mv_3$ (908) of block 904 could be used as the predictors of motion vectors $mv_0$ (910) and $mv_1$ (912) of the current block 900 because the reference frames of the neighboring blocks are different from the reference frame of the current block, even though the motion from either side is very close and can potentially provide a good prediction. However, because the current block 900 shares a common reference frame ($F_3$) with neighboring block 902, and a common reference frame ($F_5$) with neighboring block 904, the motion $mv_2$ (906) from block 902 and the motion $mv_3$ (908) from block 904 can be combined to produce a bi-predictive motion ($mv_2$, $mv_3$) predictor for the motion ($mv_0$, $mv_1$) of the current block 900. In some examples, even if some or all of the neighboring blocks' reference frames are not the same as the reference frame(s) used by the current block, the neighboring blocks' motion vectors can be used to derive the predictor for the motion of the current block through temporal scaling, as described above in the single prediction case.

In some examples, the decoder accesses the motion vectors of the blocks above the current block to construct the motion vector prediction list. Typically, hardware decoders use dedicated buffers (e.g., line buffers) to store the motion vectors of the blocks in the above rows. If more spatial motion vector prediction candidates are constructed in accordance with the techniques described here, the motion vector prediction list can have enough motion vector prediction candidates without accessing the motion vectors of several rows of blocks above the current block. Thus, the number of line buffers needed (e.g., by the encoder or decoder) can be reduced, thereby reducing the decoder cost and complexity. In addition, with more motion vector prediction candidates, it is easier to fill the motion vector prediction list with the requisite number of motion vector predictors. This can help design the entropy coding of the motion vectors without context dependencies, which can increase parsing and decoding throughput.

Optimizing the Scanning Order of Motion Vector Prediction Candidates

Figure 10:
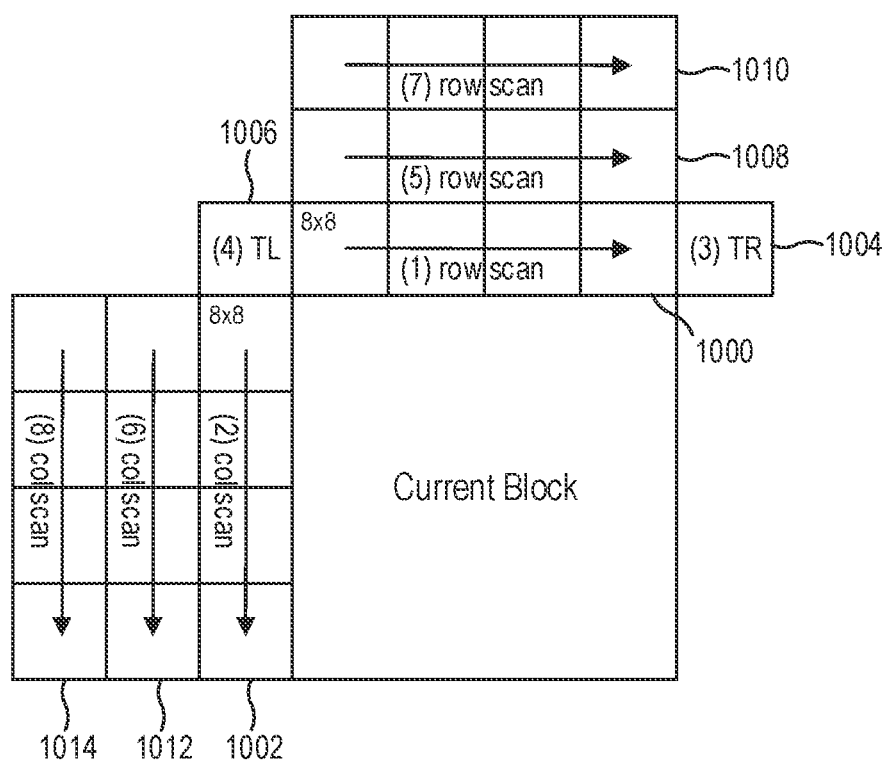
FIG. 10 illustrates a diagram of an example spatial motion vector search pattern.

The candidate motion vector list construction in some video coding standards, such as AV1, can include spatial and temporal motion vector prediction steps. For example, FIG. 10 illustrates a process for spatial motion vector construction used in AV1. In this example, the numbers in each row and column indicate the scan order: the process starts from the nearest row 1000 and column 1002, then moves towards the top right (TR) 1004 and top left (TL) 1006, and then the outer rows 1008, 1010 and columns 1012, 1014. At a maximum, three 8×8 block rows and columns are used to search for the corresponding spatial motion vector prediction candidates.

In AV1, the motion vector prediction candidates from neighboring blocks and temporal reference frames are classified into two categories. For example, as shown in FIG. 11, the motion vector candidates from the nearest row, nearest column, and top right belong to category 1, and motion vector candidates from the temporal reference frames, the top left, and outer rows/columns are grouped into category 2. The blocks in category 1 are assigned higher weights, and thus higher priority, compared to the blocks in category 2. In some examples, the weight is added to the blocks in both categories based on the frequency count of the motion vectors in an 8×8 unit. Once the weights have been assigned, the motion vector candidates are sorted based on the weights. In some examples, the top four candidates of the motion vector list are used as motion vector prediction candidates for the current block. Other video coding standards, such as HEVC and VVC, use a similar process in which the motion vectors in the spatiotemporal neighborhood are ordered according to certain pre-specified conditions and used for prediction based on the order.

As can be seen from the exemplary motion vector list construction process in FIG. 11, motion vector candidates from the nearest row/column and top right neighboring blocks are assigned the highest priority. However, if, for example, the temporal distance between two frames is very small and the motion is linear, the motion vector candidates from the temporal reference frames may provide a better prediction (e.g., provide better motion vector coding efficiency) for the motion vector of the current block than the spatial motion vector candidates.

To improve coding efficiency, the motion vector list construction process shown in FIG. 12 can be used. In this example, if the motion is linear and the temporal distance between a reference frame and the current frame is very small, then the temporal motion vector candidates are classified into category 1 and will be assigned a higher weight. The temporal motion vector candidates that do not meet these criteria can remain in category 2.

In an alternative embodiment, instead of using the motion vectors in the motion vector prediction list in isolation, the motion vector candidates can be combined to generate a combined motion vector predictor candidate. In particular, the motion vector candidates could be evaluated based on their correlation and/or positioning in relationship to each other and the current block. For example, if multiple blocks in a particular direction around the current block have similar motion, then it is highly likely that the motion vector of the current block is similar to the motion vectors of those blocks. Thus, the relationship among these motion vectors can be evaluated to perform a form of an interpolation or extrapolation to generate a derived motion vector candidate for the current block. The derivation could be, for example, an ordered or median filter, a weighted average based on the distance compared to the current block or reliability, which may include quality, of the neighboring partitions, or combinations of them, among other methods. The process could also use machine learning based schemes to generate the derived motion vector. The method could be fixed or adaptive and information associated with the process, including control parameters, could be signaled at the sequence, frame, or other sub-frame level (e.g. tile, sub-picture, slice, segmentation group, etc.). The relationship of the spatial predictors with the temporal predictors could also be considered to derive the motion vector for the current block.

In some examples, the derived motion vector predictor candidate can be the only predictor used for the prediction of the current motion vector, in which case signaling would not be needed. In some examples, the derived motion vector predictor candidate can be added into the motion vector prediction list as an additional motion vector candidate. The order of such candidates could be fixed (e.g., placed first in the list), or could be explicitly signaled or be adaptively determined in the bitstream (e.g. based on the success of such a motion vector). Higher order prediction could also be used for the determination of such a predictor.

In some examples, the scanning order that constructs the motion vector list can be designed as an adaptive solution instead of a fixed order process to improve the motion vector coding efficiency. The adaptation can be signaled (e.g., by an encoder) or derived (e.g., by a decoder) at block, tile, region, frame, sequence, or some other level. It should be noted that for smaller partitions the cost of signaling such information may not be negligible. To reduce such cost, adaption can be limited to partitions above a certain block size in some examples. As another example, adaptation can be constrained to fewer candidates for certain block sizes, thus reducing the potential overhead that may be introduced if adaptation was supported for all partitions without limit. Limitations may also exist for partitions pointing to certain reference indices or for bi-prediction or multi-hypothesis prediction so as to reduce the overhead of the signaling. For example, if bi-prediction or multi-hypothesis prediction is used, and the block is of a certain size or lower, then the motion vector list can be implicit and no signaling is involved. Otherwise, a signal that specifies the motion vector list could be used.

Instead of also having to send explicit instructions of how to order the list, a prefixed set of possible candidate lists could be specified. Such lists could be predefined, or signaled at a higher level (e.g., sequence or frame level), and selected through simple signaling of their index at a lower level (e.g., tile or segmentation group level). Such concepts could also be adaptive, and persist for N blocks or until canceled through signaling in the bitstream (e.g., by a flag or by a particular coding mode that indicates a reorganization of the motion vector prediction list).

Recorded Motion Vector Prediction

In some examples, motion vectors from one or more previously encoded blocks can provide a good prediction for the motion vector of the current block. As such, the motion vectors from previously encoded blocks can be stored as motion vector prediction candidates for future blocks (e.g., in a motion vector predictor list) in addition to or instead of the motion vectors from neighboring blocks. In some examples, the motion vectors from the previously encoded blocks (or other blocks) can be assigned a priority (e.g., within the motion vector predictor list). For example, motion vectors associated with the nearest blocks and/or the most recently encoded blocks can be assigned a higher priority relative to motion vectors associated with further blocks and/or earlier encoded blocks. As another example, motion vectors that are the same or similar over a large region (e.g., a large prediction block size) can be assigned a higher priority relative to motion vectors that share similarities over a small region (e.g., a small prediction block size) or do not share similarities at all. In some examples, the stored motion vectors are deleted from storage (e.g., a buffer) in accordance with the assigned priority, with lower priority motion vectors being deleted first. For example, when the motion vector predictor list exceeds the maximum allowed capacity, the motion vectors can be deleted from the list in accordance with the assigned priority. In some examples, a duplicate check is performed to prevent duplication of motion vectors in the motion vector predictor list.

Figure 13A:
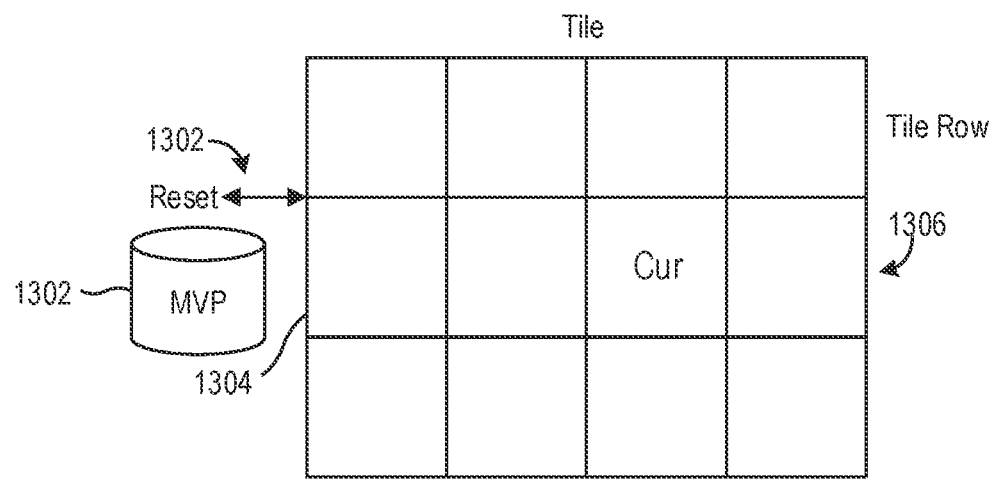
FIGS. 13A and 13B illustrate an example of recorded motion vector prediction.

In some video coding standards, the motion vector predictor list is reset before encoding a first portion of the input data (e.g., the first super block of each tile row). For example, as shown in FIG. 13A, the motion vector predictor list 1300 is reset 1302 before encoding the first super block 1304 of the tile row 1306. As a result, there may be no available motion vector prediction candidates when coding, for example, the first super block 1304 (or other blocks in the row), resulting in a decrease in coding efficiency.

Figure 13B:
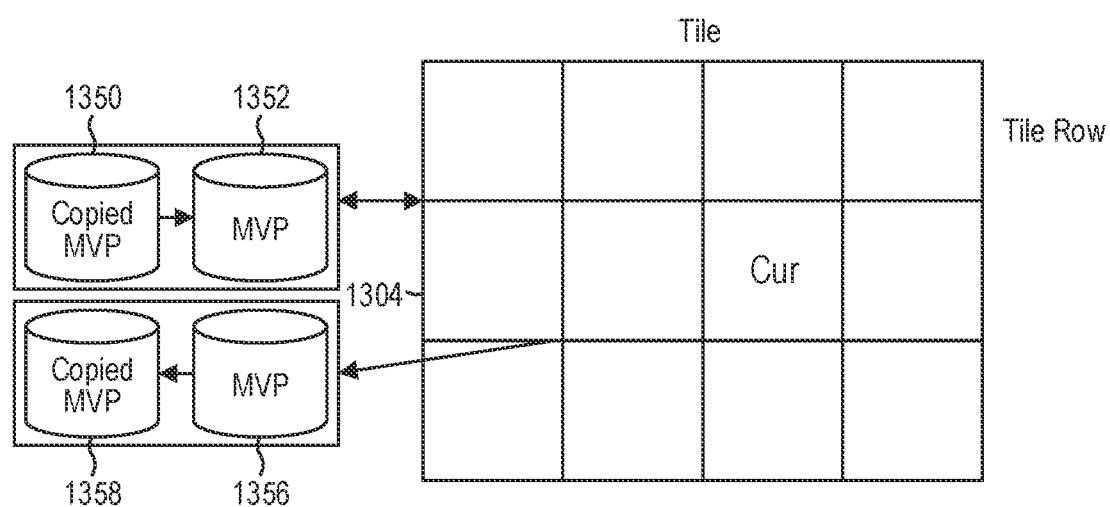

In some examples, after encoding the first portion of input data (e.g., the first super block of a tile row), the stored motion vector predictor list is copied to another motion vector predictor list for initializing the motion vector predictor list of a second portion of the input data (e.g., the first super block in the next tile row). For example, referring to FIG. 13B, the motion vector predictor list 1350 copied from a previous row is used to initialize the motion vector predictor list 1352 for the first super block 1354 of the next row. After encoding the block 1354, the resulting motion vector predictor list 1356 (which may be the same as or different from the list 1352) is copied to a motion vector predictor list 1358. The list 1358 can then be used, for example, to initialize the motion vector predictor list for encoding the first super block of the next tile row. By reusing the motion vector predictor list across tile rows, coding efficiency is increased. In some examples, only the motion vector predictor list of the first super block of the previous row (e.g., the row above or below the current row) is copied rather than copying predictors for multiple rows or multiple blocks within a row, thereby reducing complexity and the consumption of storage resources.

In some examples, the motion vector predictors can be updated on-the-fly once a block is encoded (e.g., as an inter predictor) in order to provide better motion vector prediction and increase coding efficiency. However, this on-the-fly updating can pose hardware complexity issues in some instances, such as when sub-blocks of a super block are parallel coded. In some examples, the recorded motion vector predictor list described above can be updated after the super block is completely coded. In addition, in some examples, the motion vectors can be assigned weights (e.g., based on the number of blocks having the same motion vector, the block size, the spatial distance to the current block, or combinations of them, among others).

Dynamic Reference List (DRL) Design

In some examples, a probability of a DRL index is estimated in order to code the DRL index efficiently. Such an estimation can be done using, for example, context models which consider the DRL index of neighboring coded blocks, reference frame parameters (e.g., type, order, quality, etc.), current frame parameters (e.g., type, QP, etc.), coding mode (e.g., inter and/or intra prediction mode), motion vector and its delta, or combinations of them, among others. In some examples, the context model exploits the number of neighboring blocks having the same reference frame(s) as the current coding block (or field pictures in the case of interlace data coding). In some examples, the neighbor of a block is split into multiple zones, and each zone can be associated with a different weight. In some examples, the context model exploits the number of neighboring blocks having the same coding mode. The specific coding mode can adapted to the current coding block and its characteristics.

Extension to Storage of Motion Vectors

Storing the motion vectors of all reference frames can consume a non-negligible amount of memory, especially for high resolution video. To reduce memory consumption, subsampling can be done on the motion information before it is saved for future frame TMVP. Different filtering algorithms could be used when downsampling the motion field to maintain better correlation of the motion field. In some examples, instead of using the vectors directly at the reduced resolution when the motion vectors are temporal predictors, the motion field could be interpolated to obtain better quality motion vectors for temporal predictors. Different types of interpolation filter could be used including bilinear, bicubic, or cosine-based filters, among others. In some examples, the filter can be applied in the spatial and/or temporal domain. A decoder (e.g., the decoder 150) can upconvert the sub-sampled motion information to the proper resolution and/or definition for prediction, thereby facilitating memory reduction when storing motion information.

In some examples, memory consumption can be reduced by storing motion information for a subset of frames (or portions thereof) for future TMVP usage. For example, if there are N frames, motion information associated with M frames can be selected for storage (where M<N), and the motion information for the remaining M-N frames can be discarded (e.g., immediately, after usage, or at some other point during processing). As another example, if a frame is split into K regions (e.g., tiles), motion information associated with L regions can be selected for storage (where L<K), and the motion information for the remaining K-L frames can be discarded (e.g., immediately, after usage, or at some other point during processing). In some examples, the frames and/or regions for which the motion information is stored can be selected based on motion type, motion magnitude, resolution, frame rate, or combinations of them, among others. The selected frames and/or regions can be signaled using high level syntax information (e.g., at the sequence, frame, or tile level), or this information could be derived at the decoder. The motion information that is not stored for a frame or region can be derived (e.g. interpolated) at the decoder, or restricted at the encoder so that it is not used.

To further reduce memory consumption (especially for mobile devices), TMVP candidates can be quantized to reduce the precision of the motion vectors before storing. For example, full-pel or half-pel precision motion vectors could be stored instead of the higher accuracy ones (e.g. ¼-pel or higher) that may have been used for motion prediction. The actual motion information precision can be signaled at a higher level syntax structure (e.g., at the sequence, frame, or tile level), or be derived at the decoder. With the improved motion vector prediction algorithm described in this disclosure, the loss of certain precision of the motion vector may not significantly impact the performance. In some examples, a decoder (e.g., the decoder 150) can upconvert (e.g., inverse quantize) the motion information to the proper precision for prediction, thereby facilitating memory reduction when storing motion information.

In some examples, temporal motion vector candidates could also be generated by considering more than one motion vector candidates from multiple temporal references and combining those candidates together. The combination could be simple averaging, weighted averaging based on the priority of the reference frames (e.g., such priority could be derived based on temporal distances, direction, and QP as discussed earlier; additional weights could also be signaled in the bitstream, e.g., at the sequence, frame, or tile level).

Entropy coding of the motion vectors is also improved and simplified due to the higher prediction quality provided by the techniques described here. For example, in AV1, the motion vector contexts for entropy coding are derived based also on neighboring motion vectors. Such derivation can have a complexity impact on encoding and decoding of the motion vectors, which can impact throughput. With the techniques proposed here, such context dependency can be avoided.

The techniques described here are not limited to video coding and can also be used in other applications that generate motion vectors using block-based methods and rely on predictive motion estimation schemes to generate motion fields (e.g., motion compensated temporal filtering for deinterlacing, denoising, scaling, and the like). The techniques described here can also be used in a variety of applications such as scalable and multi-view video coding, coding of point clouds or mesh information based on video coding methods (e.g., using the V3C/V-PCC specifications), intra block copy prediction, or for fractal-based image/video coding, where the reference can be an earlier coded region or an earlier coded version (e.g., lower resolution or lower quality) of the same image, among others.

Example Processes

Figure 14:
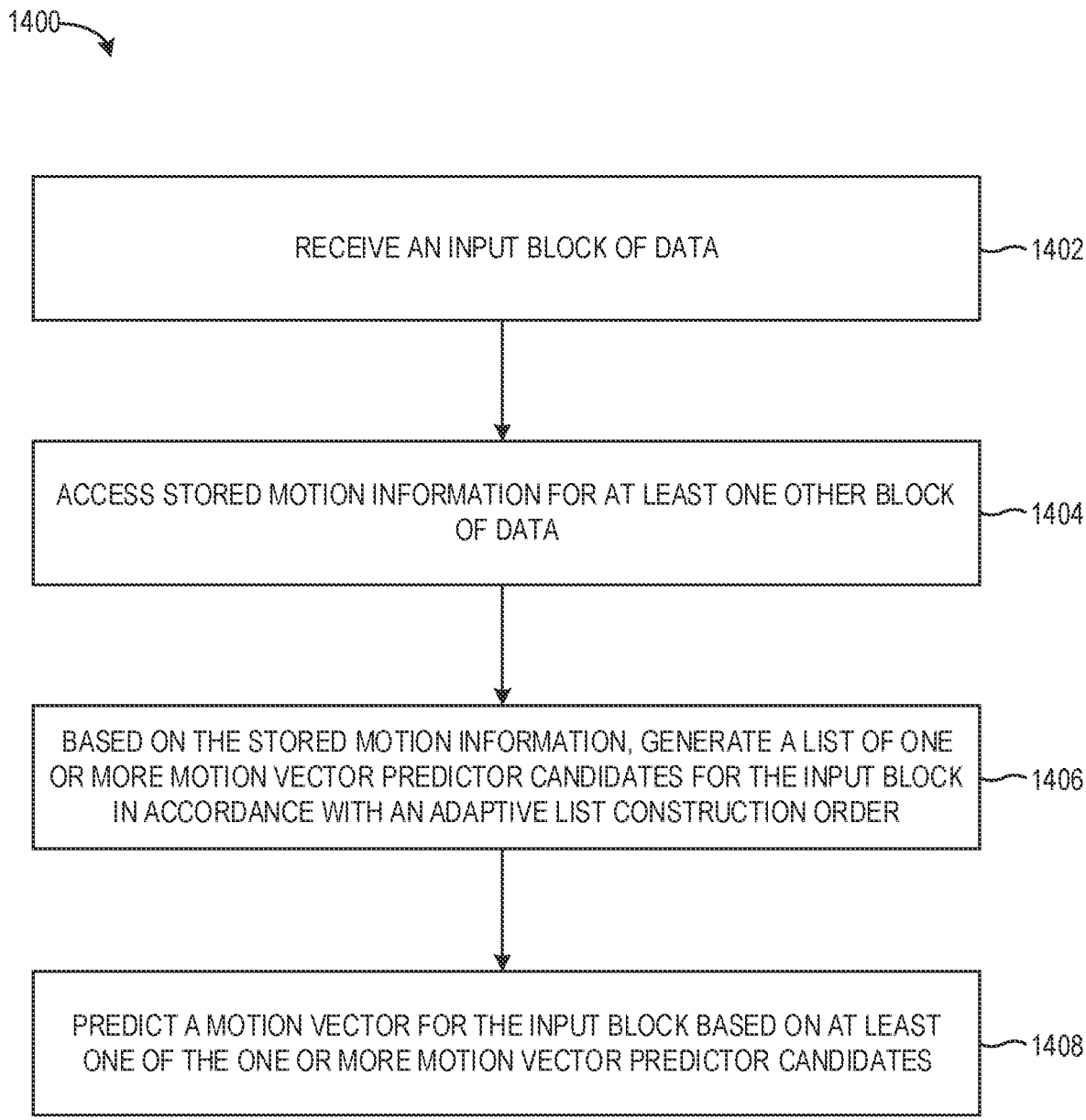
FIG. 14 illustrates an example process for enhanced motion vector prediction.

FIG. 14 illustrates an example process 1400 for enhanced motion vector prediction. In some implementations, the process 1400 is performed by one or more of the devices or systems described here, such as the encoder 100 and/or the decoder 150 shown in FIGS. 1A and 1B or components thereof.

Operations of the process 1400 include receiving 1402 an input block of data. In some examples, the input block corresponds to image or video data and is received by an encoder (e.g., the encoder 100) to be encoded. In some examples, the input block is encoded and is received by a decoder (e.g., the decoder 150) to be decoded.

Stored motion information for at least one other block of data is accessed 1404. The stored motion information can include, for example, stored motion vectors and reference indices. In some examples, the at least one other block of data is a previously coded block having been coded using intra prediction, and the stored motion information includes a projected motion vector associated with the at least one other block (e.g., a position of the at least one other block in a frame). In some examples, the at least one other block of data is a previously coded block having been coded using inter uni-prediction, and the stored motion information includes a motion vector with a backward reference. In other examples, the at least one other block is a block previously coded through other means (e.g., bi-prediction or multi-hypothesis).

Based on the stored motion information, a list of one or more motion vector predictor candidates (e.g., spatial motion vector predictor candidates and/or temporal motion vector predictor candidates) for the input block is generated 1406. The list can be generated in accordance with an adaptive list construction order. For example, the motion information for the at least one other block can be analyzed to determine whether it corresponds to linear motion, and a temporal distance between a frame associated with the at least one other block and a frame associated with the input block can be compared with a threshold value. If the motion information is determined to include linear motion, and the temporal distance is determined to satisfy (e.g., be less than) the threshold, then motion vector predictor candidates associated with the at least one other block can be prioritized in the list (e.g., moved up in priority relative to their priority without the aforementioned determinations). In some examples, the adaptive list construction order can be signaled by the encoder, derived by the decoder, or both (e.g., by the decoder deriving the order and altering the order in accordance with altering parameters (e.g., delta signals) received from the encoder).

A motion vector for the input block of data is predicted 1408 based on at least one of the one or more motion vector predictor candidates included in the list. In some examples, the list of motion vector predictor candidates is arranged in a priority order as described herein, and a subset (e.g., four) of the motion vector predictor candidates are combined (e.g., through averaging, weighted averaging, etc.) to predict the motion vector for the input block of data. In another example, the highest priority motion vector predictor candidate is used to predict the motion vector for the input block. In some examples, motion compensation is performed based on the motion vector predictor candidates (e.g., in order of priority) to generate a predicted block for the input block. The input block and the predicted block are compared to determine a residual, and the motion vector predictor candidate is selected for predicting the motion vector of the current block when the residual satisfies (e.g., is less than) a threshold value. In this manner, motion vector prediction can be terminated earlier in many instances, thereby reducing consumption of computing resources and increasing coding efficiency.

In some examples, such as when the input block is received by an encoder, the input block is encoded using the predicted motion vector. For instance, in some examples, motion compensation is performed using the predicted motion vector to produce a predicted block for the input block. The input block and the motion compensated input block are compared to determine a residual, and the quantized and transformed residual is entropy coded (along with motion information, prediction information, and/or other control information) to encode the input block. In other examples, such as when the input block is received by a decoder, the input block is decoded using the predicted motion vector. For example, the input block is entropy decoded to obtain the residual data coefficients (and other motion, prediction, and control information). The predicted motion vector derived at the decoder (alone or in combination with signaling from the encoder) is used to generate a predicted block for the input block, and the input block and the predicted block are combined to decode the input data.

In some examples, the motion vector field associated with the input block is downsampled to produce a downsampled motion vector field. The downsampled motion vector field can be stored in memory (e.g., a buffer, such as a line buffer). In some examples, one or more of the motion vector predictor candidates (or the predictor motion vector itself) are quantized to produce quantized motion vector predictor candidates that have a lower precision than their unquantized counterparts. The quantized motion vector predictor candidates can be stored in memory (e.g., a line buffer).

In some examples, the input block is part of a current frame, and the process 1400 includes identifying reference frames for the current frame, determining a score for each of the reference frames based at least in part on a temporal distance between the current frame and the respective reference frame, and prioritizing the reference frames for use in predicting the motion vector of the input block based on the score. In some examples, determining the score for each of the reference frames is based on a quality (e.g., pixel quality) of the reference frame (or portion thereof), a determination of whether a motion vector associated with the reference frame crosses the current frame, or both, among others. In some examples, an overwrite rule is based at least in part on the score assigned to a reference frame, in which a motion vector associated with a first reference frame is not allowed to overwrite a motion vector associated with a second reference frame when the second reference frame has a higher score than the first reference frame.

In some examples, the at least one other block of data is part of a same frame as the input block, and the process 1400 includes determining that a reference frame of the at least one other block of data is different from but in the same direction as a reference frame of the input block of data. In response to the determination, a scaling algorithm is applied to the motion information for the at least one other block of data to generate a motion vector predictor for the input block of data. In some examples, the input block of data is coded in an inter uni-prediction mode.

In some examples, the process 1400 includes accessing stored motion information for at least two other blocks of data that are each part of a same frame as the input block, and determining that a reference frame for each of the at least two other blocks of data is different from a reference frame of the input block of data. In response to the determination, the motion information for the at least two other previously coded blocks of data is combined to generate a motion vector predictor for the input block of data. In some examples, the input block of data is coded in a bi-predictive or multi-hypothesis inter prediction mode.

In some examples, the input block of data is a first block of a first tile row, and a motion vector predictor list for the input block is stored as a motion vector predictor list for a first block of a second tile row.

Example Computer System

Figure 15:
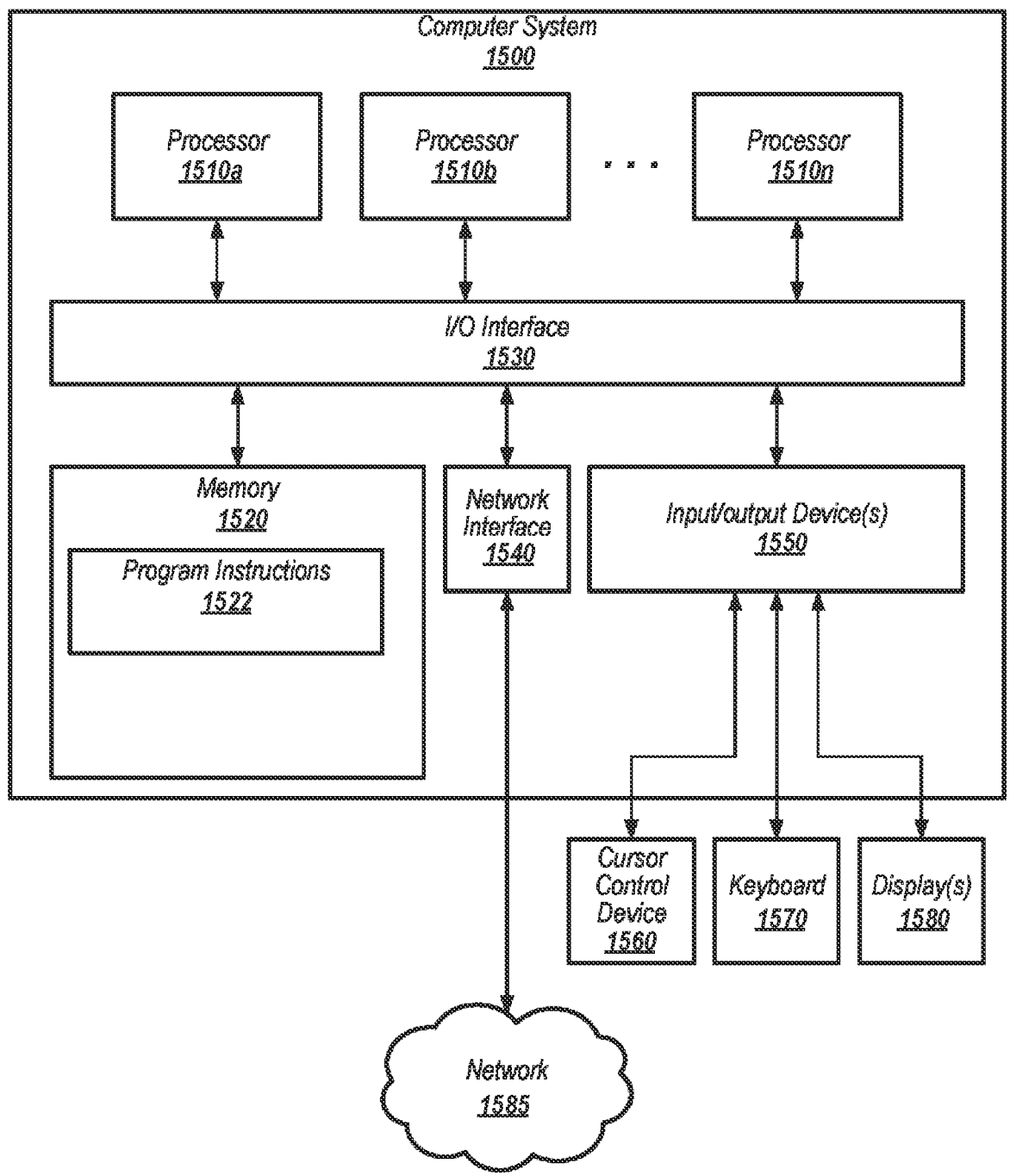
FIG. 15 illustrates an example computer system that may implement an encoder or decoder.

FIG. 15 illustrates an example computer system 1500 that may implement an encoder or decoder or any other ones of the components described here, (e.g., any of the components described above with reference to FIGS. 1-14), in accordance with some implementations. The computer system 1500 may be configured to execute any or all of the implementations described above. In different implementations, computer system 1500 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various implementations of a single-stage or multi-stage coding system as described here, including its components such as an encoder or decoder, may be executed in one or more computer systems 1500, which may interact with various other devices. Note that any component, action, or functionality described above with respect to FIGS. 1-14 may be implemented on one or more computers configured as computer system 1500 of FIG. 15, according to various implementations. In the illustrated implementation, computer system 1500 includes one or more processors 1510a, 1510b, . . . , 1510n coupled to a system memory 1520 via an input/output (I/O) interface 1530. Computer system 1500 further includes a network interface 1540 coupled to I/O interface 1530, and one or more input/output devices 1550, such as cursor control device 1560, keyboard 1570, and display(s) 1580. In some cases, it is contemplated that implementations may use a single instance of computer system 1500, while in other implementations multiple such systems, or multiple nodes making up computer system 1500, may be configured to host different portions or instances of implementations. For example, in one implementation some elements may be implemented via one or more nodes of computer system 1500 that are distinct from those nodes implementing other elements.

In various implementations, computer system 1500 may be a uniprocessor system including one processor 1510, or a multiprocessor system including several processors 1510 (e.g., two, four, eight, or another suitable number). Processors 1510 may be any suitable processor capable of executing instructions. For example, in various implementations processors 1510 may be general-purpose or embedded processors implementing any of a variety of instruction set architectures (ISAs), such as the x86, PowerPC, SPARC, or MIPS ISAs, or any other suitable ISA. In multiprocessor systems, each of processors 1510 may commonly, but not necessarily, implement the same ISA.

System memory 1520 may be configured to store point cloud compression or point cloud decompression program instructions 1522 and/or sensor data accessible by processor 1510. In various implementations, system memory 1520 may be implemented using any suitable memory technology, such as static random access memory (SRAM), synchronous dynamic RAM (SDRAM), nonvolatile/Flash-type memory, or any other type of memory. In the illustrated implementation, program instructions 1522 may be configured to implement an image sensor control application incorporating any of the functionality described above. In some implementations, program instructions and/or data may be received, sent or stored upon different types of computer-accessible media or on similar media separate from system memory 1520 or computer system 1500. While computer system 1500 is described as implementing the functionality of functional blocks of previous Figures, any of the functionality described here may be implemented via such a computer system.

In one implementation, I/O interface 1530 may be configured to coordinate I/O traffic between processor 1510, system memory 1520, and any peripheral devices in the device, including network interface 1540 or other peripheral interfaces, such as input/output devices 1550. In some implementations, I/O interface 1530 may perform any necessary protocol, timing or other data transformations to convert data signals from one component (e.g., system memory 1520) into a format suitable for use by another component (e.g., processor 1510). In some implementations, I/O interface 1530 may include support for devices attached through various types of peripheral buses, such as a variant of the Peripheral Component Interconnect (PCI) bus standard or the Universal Serial Bus (USB) standard, for example. In some implementations, the function of I/O interface 1530 may be split into two or more separate components, such as a north bridge and a south bridge, for example. Also, in some implementations some or all of the functionality of I/O interface 1530, such as an interface to system memory 1520, may be incorporated directly into processor 1510.

Network interface 1540 may be configured to allow data to be exchanged between computer system 1500 and other devices attached to a network 1585 (e.g., carrier or agent devices) or between nodes of computer system 1500. Network 1585 may in various implementations include one or more networks including but not limited to Local Area Networks (LANs) (e.g., an Ethernet or corporate network), Wide Area Networks (WANs) (e.g., the Internet), wireless data networks, some other electronic data network, or some combination thereof. In various implementations, network interface 1540 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1550 may, in some implementations, include one or more display terminals, keyboards, keypads, touchpads, scanning devices, voice or optical recognition devices, or any other devices suitable for entering or accessing data by one or more computer systems 1500. Multiple input/output devices 1550 may be present in computer system 1500 or may be distributed on various nodes of computer system 1500. In some implementations, similar input/output devices may be separate from computer system 1500 and may interact with one or more nodes of computer system 1500 through a wired or wireless connection, such as over network interface 1540.

As shown in FIG. 15, memory 1520 may include program instructions 1522, which may be processor-executable to implement any element or action described above. In one implementation, the program instructions may implement the methods described above. In other implementations, different elements and data may be included. Note that data may include any data or information described above.

Those skilled in the art will appreciate that computer system 1500 is merely illustrative and is not intended to limit the scope of implementations. In particular, the computer system and devices may include any combination of hardware or software that can perform the indicated functions, including computers, network devices, Internet appliances, PDAs, wireless phones, pagers, among others. Computer system 1500 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other implementations some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some implementations, instructions stored on a computer-accessible medium separate from computer system 1500 may be transmitted to computer system 1500 via transmission media or signals such as electrical, electromagnetic, or digital signals, conveyed via a communication medium such as a network and/or a wireless link. Various implementations may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, and the like), ROM, among others. In some implementations, a computer-accessible medium may include transmission media or signals such as electrical, electromagnetic, or digital signals, conveyed via a communication medium such as network and/or a wireless link.

The methods described here may be implemented in software, hardware, or a combination thereof, in different implementations. In addition, the order of the blocks of the methods may be changed, and various elements may be added, reordered, combined, omitted, modified, and the like. Various modifications and changes may be made as would be obvious to a person skilled in the art having the benefit of this disclosure. The various implementations described here are meant to be illustrative and not limiting. Many variations, modifications, additions, and improvements are possible. Accordingly, plural instances may be provided for components described here as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of implementations as defined in the claims that follow.

What is claimed is:

1. A decoder, comprising:
   at least one processor; and
   memory storing instructions which, when executed by the at least one processor, cause the at least one processor to perform operations comprising:
      receiving an input block of data;
      accessing stored motion information for at least one other block of data;
      based on the stored motion information, generating a list of one or more motion vector predictor candidates for the input block in accordance with an adaptive list construction order, wherein the adaptive list construction order assigns a weight to a motion vector predictor candidate based in part on (i) a type of motion associated with the motion vector predictor candidate, and (ii) a comparison of a temporal distance between a frame including the input block and a frame including the motion vector predictor candidate with a threshold value; and
      predicting a motion vector for the input block based on at least one of the one or more motion vector predictor candidates.

2. The decoder of claim 1 storing instructions which, when executed by the at least one processor, cause the at least one processor to perform operations comprising:
   generating a predicted block for the input block by applying the motion vector to the at least one other block; and
   decoding the input block based at least in part on the predicted block.

3. The decoder of claim 1, wherein the input block is part of a current frame, the memory storing instructions which, when executed by the at least one processor, cause the at least one processor to perform operations comprising:
   identifying a plurality of reference frames for the current frame;
   determining a score for each of the plurality of reference frames based at least in part on a temporal distance between the current frame and a respective reference frame; and
   based on the score, prioritizing the plurality of reference frames.

4. The decoder of claim 3, wherein determining the score for each of the plurality of reference frames is based at least in part on a pixel quality of at least a portion of the respective reference frame.

5. The decoder of claim 3, wherein determining the score for each of the plurality of reference frames is based at least in part on whether a motion vector associated with the respective reference frame crosses the current frame.

6. The decoder of claim 3 storing instructions which, when executed by the at least one processor, cause the at least one processor to perform operations comprising:

based on the stored motion information, generating a projected motion vector from the current frame to a first reference frame of the plurality of reference frames; and assigning a priority to the projected motion vector based at least in part on the score of the first reference frame.

7. The decoder of claim 6, wherein the projected motion vector comprises a first projected motion vector, the memory storing instructions which, when executed by the at least one processor, cause the at least one processor to perform operations comprising:

generating a second projected motion vector from the current frame to a second reference frame of the plurality of reference frames, wherein the second reference frame has a lower score than the first reference frame, and wherein the first projected motion vector is not allowed to be overwritten by the second projected motion vector due to the second reference frame having a lower score than the first reference frame.

8. The decoder of claim 1, wherein the at least one other block comprises a previously coded block having been coded using inter uni-prediction, and wherein the stored motion information comprises a motion vector with a backward reference.

9. The decoder of claim 1, wherein the at least one other block comprises a previously coded block having been coded using intra prediction, and wherein the stored motion information comprises a projected motion vector.

10. The decoder of claim 1 storing instructions which, when executed by the at least one processor, cause the at least one processor to perform operations comprising:

determining that the motion information for the at least one other block comprises linear motion;

determining that a temporal distance between a frame associated with the at least one other block and a frame associated with the input block satisfies a threshold value; and increasing a priority of a motion vector predictor candidate associated with the at least one other block in the list of the one or more motion vector predictor candidates based on the determination that the motion information comprises linear motion and the determination that the temporal distance satisfies the threshold value.

11. The decoder of claim 1, wherein the input block and the at least one other block are part of a same frame, the memory storing instructions which, when executed by the at least one processor, cause the at least one processor to perform operations comprising:

determining that a reference frame of the at least one other block is different from but in the same direction as a reference frame of the input block; and responsive to the determination, applying a scaling algorithm to the motion information for the at least one other block to generate a motion vector predictor for the input block.

12. The decoder of claim 11, wherein the input block is coded in an inter uni-prediction mode.

13. The decoder of claim 1 storing instructions which, when executed by the at least one processor, cause the at least one processor to perform operations comprising:

accessing stored motion information for at least two other blocks of data, wherein the at least two other blocks and the input block of data are part of a same frame;

determining that a reference frame for each of the at least two other blocks is different from a reference frame of the input block; and responsive to the determination, combining the motion information for the at least two other previously coded blocks of data to generate a motion vector predictor for the input block.

14. The decoder of claim 13, wherein the input block is coded in a bi-predictive or multi-hypothesis inter prediction mode.

15. The decoder of claim 1, wherein the input block comprises a first block of a first tile row, the memory storing instructions which, when executed by the at least one processor, cause the at least one processor to perform operations comprising storing the list of one or more motion vector predictor candidates for the input block as a list of one or more motion vector predicator candidates for a first block of a second tile row.

16. The decoder of claim 1, wherein the stored motion information is downsampled, the memory storing instructions which, when executed by the at least one processor, cause the at least one processor to perform operations comprising:

upconverting the stored motion information; and generating the list of the one or more motion vector predictor candidates for the input block based on the upconverted motion information.

17. The decoder of claim 1, wherein the stored motion information is quantized, the memory storing instructions which, when executed by the at least one processor, cause the at least one processor to perform operations comprising:

inverse quantizing the stored motion information; and generating the list of the one or more motion vector predictor candidates for the input block based on the inverse quantized motion information.

18. The decoder of claim 1, wherein the adaptive list construction order assigns a greater weight to a motion vector predictor candidate that is (i) associated with linear motion, and (ii) is in a frame that is within a threshold temporal distance from the frame including the input block, relative to a weight assigned to a motion vector predictor candidate that is not associated with linear motion or is in a frame that is not within the threshold temporal distance from the frame including the input block.

19. A method for decoding data, comprising:

receiving an input block of data;

accessing stored motion information for at least one other block of data;

based on the stored motion information, generating a list of one or more motion vector predictor candidates for the input block in accordance with an adaptive list construction order, wherein the adaptive list construction order assigns a weight to a motion vector predictor candidate based in part on (i) a type of motion associated with the motion vector predictor candidate, and (ii) a comparison of a temporal distance between a frame including the input block and a frame including the motion vector predictor candidate with a threshold value; and predicting a motion vector for the input block based on at least one of the one or more motion vector predictor candidates.

20. An encoder, comprising:

at least one processor; and memory storing instructions which, when executed by the at least one processor, cause the at least one processor to perform operations comprising:

receiving an input block of data;

accessing stored motion information for at least one other block of data;

based on the stored motion information, generating a list of one or more motion vector predictor candidates for the input block in accordance with an adaptive list construction order, wherein the adaptive list construction order assigns a weight to a motion vector predictor candidate based in part on (i) a type of motion associated with the motion vector predictor candidate, and (ii) a comparison of a temporal distance between a frame including the input block and a frame including the motion vector predictor candidate with a threshold value; and predicting a motion vector for the input block based on at least one of the one or more motion vector predictor candidates.

* * * * *